US012406447B2

(12) United States Patent
McGahan et al.

(10) Patent No.: US 12,406,447 B2
(45) Date of Patent: Sep. 2, 2025

(54) MULTI-SIDED 3D PORTAL

(71) Applicant: Lowe's Companies, Inc., Mooresville, NC (US)

(72) Inventors: Deane McGahan, Shoreline, WA (US); Mason E. Sheffield, Woodinville, WA (US)

(73) Assignee: Lowe's Companies, Inc., Mooresville, NC (US)

( * ) Notice: Subject to any disclaimer, the term of this patent is extended or adjusted under 35 U.S.C. 154(b) by 146 days.

(21) Appl. No.: 18/365,904

(22) Filed: Aug. 4, 2023

(65) Prior Publication Data

US 2025/0046022 A1   Feb. 6, 2025

(51) Int. Cl.
*G06T 19/00* (2011.01)
*G06T 15/40* (2011.01)
*G06T 19/20* (2011.01)

(52) U.S. Cl.
CPC ............ *G06T 19/006* (2013.01); *G06T 15/40* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 10,373,392 | B2 * | 8/2019 | Christen | G06T 19/20 |
| 10,908,682 | B2 * | 2/2021 | Goossens | G06F 3/011 |
| 11,288,875 | B2 * | 3/2022 | Khalid | G06T 17/20 |
| 2011/0310100 | A1 * | 12/2011 | Adimatyam | G06F 3/017 |
| | | | | 382/103 |
| 2012/0162210 | A1 * | 6/2012 | Cabrita | G06T 19/00 |
| | | | | 345/419 |
| 2019/0043447 | A1 * | 2/2019 | Chung | G02B 27/017 |
| 2020/0013231 | A1 * | 1/2020 | Maitlen | G06T 19/00 |
| 2020/0014907 | A1 * | 1/2020 | Lee | H04N 21/84 |
| 2020/0250889 | A1 * | 8/2020 | Li | G06T 7/73 |
| 2020/0302681 | A1 * | 9/2020 | Totty | G06T 15/205 |
| 2021/0097762 | A1 * | 4/2021 | Spivak | G06F 8/61 |
| 2021/0287453 | A1 * | 9/2021 | Chapman | G06F 3/04817 |
| 2021/0311608 | A1 * | 10/2021 | Sommer | G06F 3/167 |
| 2024/0020930 | A1 * | 1/2024 | Li | G06T 5/50 |

OTHER PUBLICATIONS

PCT/US2024/039148, "International Search Report and Written Opinion", Oct. 21, 2024, 11 pages.

* cited by examiner

*Primary Examiner* — Ryan M Gray
(74) *Attorney, Agent, or Firm* — Kilpatrick Townsend & Stockton LLP

(57) ABSTRACT

Methods, systems, and apparatuses for presenting, in a mixed reality (MR) session, a three-dimensional portal object in a first orientation and present, a first window on a first surface of the three-dimensional portal object, the first window being associated with a first mixed reality (MR) scene. The instructions further configure the device to determine, based on the first orientation and a mapping between windows and surfaces of the three-dimensional portal object, a second window to be queued, wherein the second window becomes presentable upon a change from the first orientation to a second orientation of the three-dimensional portal object in the MR session and being associated with a second MR scene. Additionally, the instructions may further configure the device to queue data usable to present the second window and the second MR scene prior to the change from the first orientation to the second orientation.

20 Claims, 11 Drawing Sheets

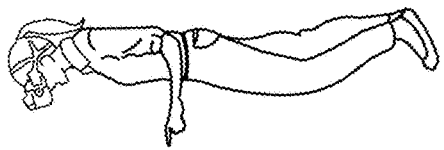 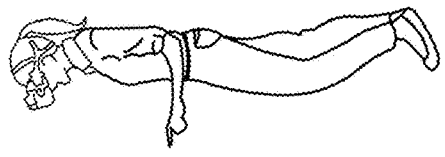
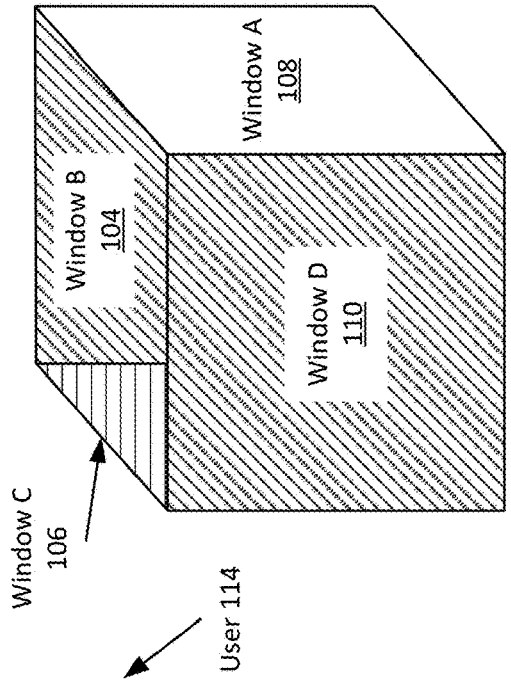
FIG. 3B
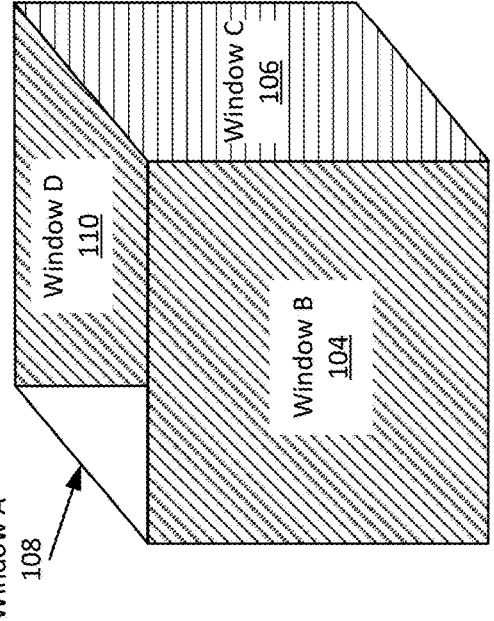
FIG. 3D
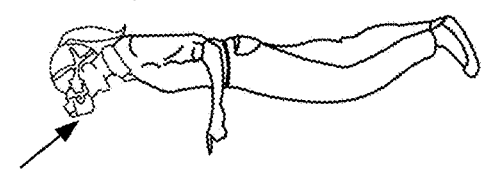
FIG. 3A
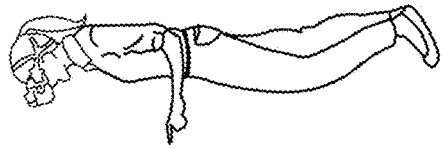
FIG. 3C
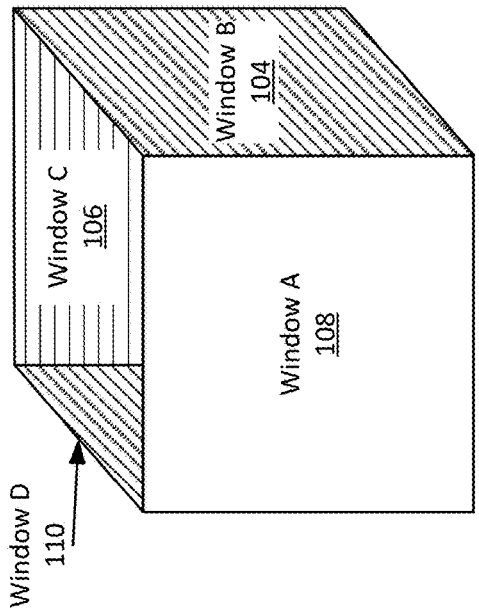 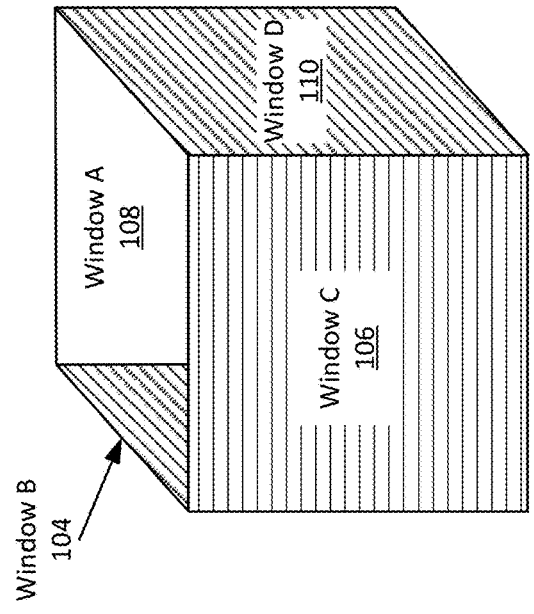

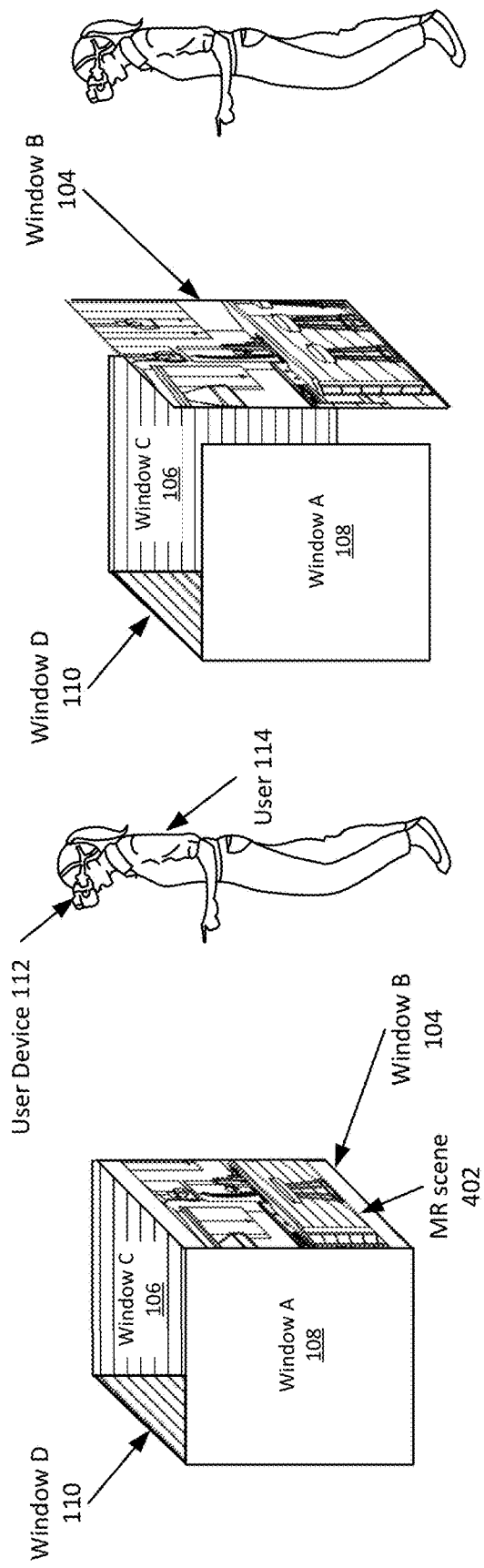
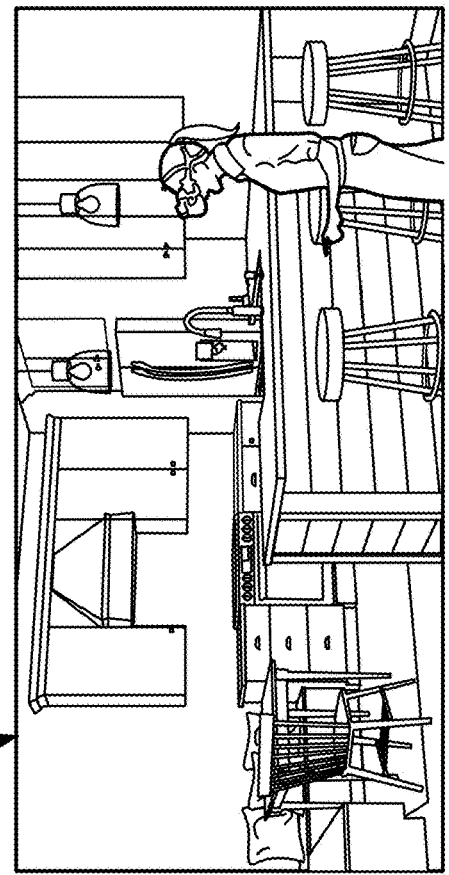
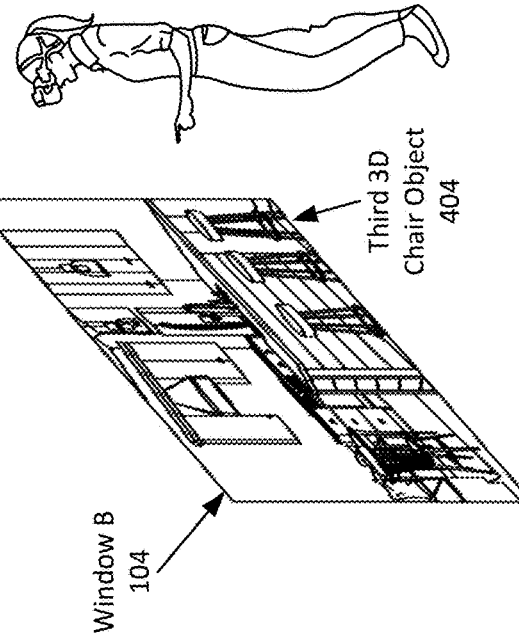

MULTI-SIDED 3D PORTAL

BACKGROUND

Rendering objects for display in mixed reality (MR) (e.g., augmented reality environments, virtual reality environments, and/or spatial computing environments) can be useful for applications in the physical world. For example, mixed reality models (e.g., virtual model of a kitchen including countertops, cabinets, appliances, etc.) of physical environments can be displayed in a MR environment. Viewing and editing a virtual model in a MR environment can help a user visualize how edits to the virtual model will affect an appearance of the installed/constructed physical objects in the environment. Conventional user interfaces may not be as effective in a MR environment where a user has increased spatial computing ability.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present disclosure describes techniques for providing, by a virtual rendering system to a user device, a MR view of a MR model.

Embodiments of the present invention may allow for the mapping of MR scenes to one or more windows of a multi-dimensional portal, the presentation of the MR scenes to a user via the one or more windows, and the capability for a user to interact with the MR scenes and the multi-dimensional portal.

One embodiment of the invention comprises a user device, the user device comprising one or more processors and one or more memory storing instructions. The instructions, upon execution by the one or more processors, configure the user device to present, during a mixed reality (MR) session, a three-dimensional portal object in a first orientation on a display of the user device, wherein the three-dimensional portal object comprises a set of windows and a set of surfaces, each window corresponding to at least one MR scene, wherein a first surface of the three-dimensional portal object is in view according to the first orientation. The execution of the instructions further configures the device to present, on the first surface of the three-dimensional portal object, at least a portion of a first window of the set of windows, the first window showing at least a portion of a first MR scene. Additionally, the execution of the instructions further configures the device to receive a first action to interact with the three-dimensional portal object by at least changing the first orientation to a second orientation of the three-dimensional portal object. Responsive to receiving the first action, the execution of the instructions configures the device to present, during the mixed reality session, the three-dimensional portal object in the second orientation on the display, wherein a second surface of the three-dimensional portal object is in view according to the second orientation, and present, on the second surface of the three-dimensional portal object, at least a portion of a second window of the set of windows, the second window showing at least a portion of a second MR scene.

Another embodiment of the invention comprises a user device, the user device comprising one or more processors and one or more memory storing instructions. The instructions, upon execution by the one or more processors, configure the user device to present, in a mixed reality (MR) session, a three-dimensional portal object in a first orientation and present, a first window on a first surface of the three-dimensional portal object, the first window being associated with a first mixed reality (MR) scene. The execution of the instructions further configures the device to determine, based on the first orientation and a mapping between windows and surfaces of the three-dimensional portal object, a second window to be queued, wherein the second window becomes presentable upon a change from the first orientation to a second orientation of the three-dimensional portal object in the MR session and being associated with a second MR scene. Additionally, the execution of the instructions further configures the device to queue data usable to present the second window and the second MR scene prior to the change from the first orientation to the second orientation.

These and other embodiments are described in further detail below.

BRIEF DESCRIPTION OF THE DRAWINGS

FIGS. 3A, 3B, 3C, and 3D illustrate an example of interactions with a portal object, according to certain embodiments disclosed herein.

FIGS. 4A, 4B, 4C, and 4D illustrate an example of interactions with a portal object, according to certain embodiments disclosed herein.

DETAILED DESCRIPTION

Figure 1:
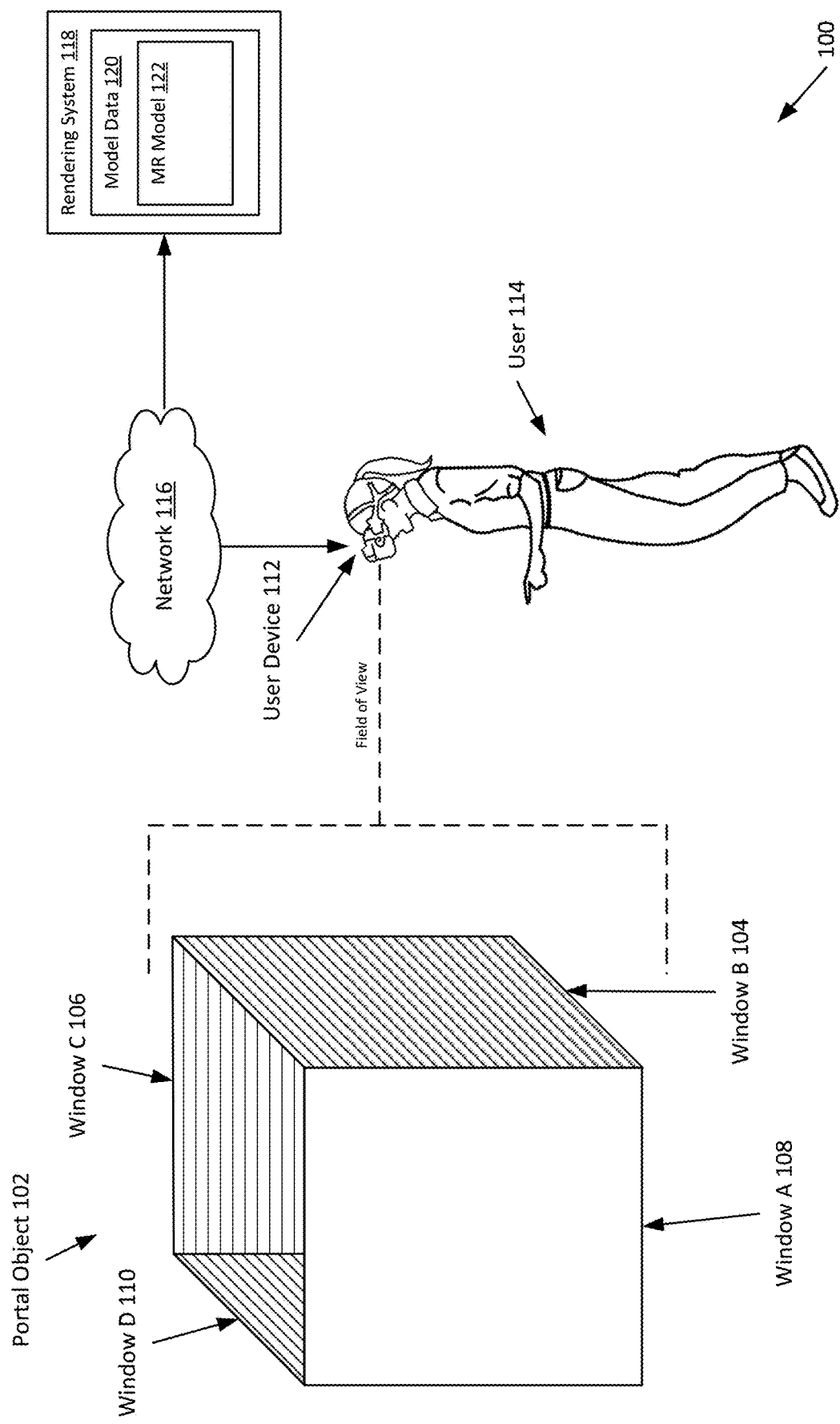
FIG. 1 illustrates a system, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

With reference to the embodiments described herein, a computing environment may include a rendering system, which can include a number of computing devices, rendering applications, and a data store. The rendering system may be configured to render a MR model of a physical environment (e.g., a virtual model of a kitchen, a compact AR model of a bedroom). The virtual model includes virtual objects corresponding to existing physical objects and an arrangement of the virtual objects. The MR model of the store can be presented in a computer-based simulated environment, such as in a virtual reality environment and/or an augmented reality environment.

Embodiments include methods and systems for presenting and interacting with MR scenes, windows, and portals.

Embodiments may allow for a multi-dimensional portal object to be presented on a display by a user device. In the present disclosure, the multi-dimensional portal object is described as a three-dimensional portal object as an example. However, the multi-dimensionality of the portal object is not limited to three dimensions. The portal object may show any number of windows and each window may be mapped to any number of corresponding MR scenes. A user of the user device may be able to view at least a portion of a MR scene shown within a window by interacting with the portal object to orient the portal object such that the window is in view and shows the portion of the MR scene. The user may have a virtual viewing position from the outside of the MR scene as if looking into the MR scene through the window.

In some embodiments, the portal object may be capable of being interacted with by a user action, such as rotating the portal object or enlarging the portal object. In some embodiments, after the user interaction with the portal object, different portions of the portal object may be presented by the user device and cause certain windows and certain MR scenes to be presented by the user device.

In an embodiment, the user can resize a the portal object, windows, and/or MR scenes by performing a second action. The second action may cause the user device to present additional portions of a MR scene. In an embodiment, the user can be presented with the MR scene in an immersive fashion such that they can look around the MR scene and have a virtual viewing position from within the MR scene.

Some terms used throughout the application may be defined as follows.

"Mixed Reality" may refer to augmented reality, virtual reality, spatial computing, or any combination thereof. A virtual reality, or "VR," scenario typically involves presentation of digital or virtual image information without transparency to other actual real-world visual input. An augmented reality, or "AR," scenario typically involves presentation of digital or virtual image information as an augmentation to visualization of the actual world around the user. A spatial computing scenario typically involves integrating user interfaces into a physical environment (e.g., objects, spaces). A device used for mixed reality application may be capable of presenting MR models (e.g., AR models, VR models, etc.).

A "user device" may be used by a user of the device. A user device may be capable of running mixed reality applications. A user device may include various sensors, such as any number of and any combination of: eye tracking sensors, gesture recognition sensors, microphones, LiDAR scanners, cameras (e.g., IR cameras), accelerometers, gyroscopes. A user device may also include other hardware such as one or more speakers, dials, fans, buttons, batteries, displays, IR illuminators, LEDs, electric motors (e.g., for vibrations), etc. Examples of user devices may be phones, tablet, headsets, smart glasses, etc.

A "portal object" may be a virtual object viewed using a user device and generated by an application running on the user device and/or remote to the user device. A portal object may be a three-dimensional object and may have any number of surfaces, edges, and vertices. A portal object may have any number of dimensions. Examples of portal objects may be a two-dimensional plane or a three-dimensional object (e.g., a sphere, pyramid, prism, torus, etc.). A portal object may have one or more windows associated with it. Each surface of a portal object may have any number of windows associated with it.

A "window" may allow for a user to view a MR scene while using a user device. A window may allow the user to view a MR scene at different angles depending on the orientation of the window with respect to the user. A window may be associated with one or more surfaces of a portal object. In an example, a window is associated with and appears as at least a portion of a surface of a portal object. A user may be able to interact with a window to allow the user to view more or less of a MR scene that is capable of being viewed through the window. Windows may define the shape of a portal object and/or may be placed on a surface of a portal object. Thus, when it is described that a portal object includes windows on surfaces or that a window is associated with a surface of a portal object, either implementation or a combination thereof may be used.

A "MR scene" may be a visual representation of a particular virtual setting. A MR scene may be three-dimensional. A MR scene may comprise any number of virtual objects. Virtual objects may be three-dimensional objects placed in a MR scene. A user may be able to view different portions of a MR scene by moving parts of their body (e.g., walking, turning around, moving their head, moving their hands, etc.). A user may be able to view a portion of a MR scene or may be able to view an entire MR scene. In an example, a user may use a user device running a MR application to look at a portal object, a surface of the portal object may be associated with a window that is associated with ("mapped" to) a MR scene, the user may be capable of viewing at least a portion of the MR scene by looking at the window. A MR scene may be akin to looking through a window to a space (e.g., looking at a kitchen through a window).

FIG. 1 illustrates a system, according to certain embodiments disclosed herein. FIG. 1 depicts an example of a computing environment 100 for providing, by a rendering system 118 via a user device 112, a view of a MR model 122 (e.g., a virtual model) in an MR environment, according to certain embodiments disclosed herein.

The rendering system 118 can include one or more processing devices that execute one or more rendering applications. In certain embodiments, the rendering system 118 includes a network server and/or one or more computing devices communicatively coupled via a network 116. The rendering system 118 may be implemented using software (e.g., code, instructions, program) executed by one or more processing units (e.g., processors, cores), hardware, or combinations thereof. The software may be stored on a non-transitory storage medium (e.g., on a memory device). The computing environment 100 is merely an example and is not intended to unduly limit the scope of claimed embodiments. Based on the present disclosure, one of the ordinary skill in the art would recognize many possible variations, alternatives, and modifications. In some instances, the rendering system 118 provides a service that enables display of virtual objects in an MR environment for users 114, for example, including a user 114 associated with a user device 112. In the example depicted in computing environment 100, a user device 112 displays, in an MR session, a MR model 122 within a field of view of the user device 112. As shown in computing environment 100, the MR model 122 is displayed in a field of view. In some cases, the MR model 122 may be displayed in a portion of the field of view and one or more physical objects may be displayed in another portion of the field of view. In some instances, the MR model 122 (e.g., a virtual model) is overlayed on one or more physical objects so that it occludes the one or more overlayed physical objects.

In some embodiments, the MR model 122 may be anchored to a point in a three-dimensional coordinate space based on actions of a user 114, the area of the physical space the user 114 is in, and/or a predetermined anchor point.

The MR model 122 may comprise a portal object 102. The portal object 102 may be presented in one or more orientations. In an embodiment, a user 114 can interact with the portal object 102 by using gestures (e.g., pinching, pointing, moving their eyes, clicking, moving their body, etc.). Upon the user device 112 detecting user a user 114 interaction, action data may be generated by the user device 112 that describes the user 114 interaction that was detected. The action data may be used by the user device 112 to control the presentation of UI elements (e.g., the portal object, windows, MR scenes, a user interface) and/or the functionality of the presented UI elements (e.g., turning the portal object 102, enlarging a window of the portal object 102, entering an immersive MR scene). In an embodiment, when the user 114 interacts with the portal object 102, generated action data may cause the orientation of the portal object 102 to be changed. A further description of the interactions that are possible with the portal object 102 are described below (e.g., with respect to FIGS. 3 and 4).

The portal object 102 may show an arrangement of windows and MR scenes. In an embodiment, each surface of the portal object 102 may comprise any number of windows (e.g., zero or more). A window may make up at least a portion of a surface of the portal object 102. Each window may be mapped to any number of MR scenes (e.g., zero or more). As an example, using exemplary computing system 100, the MR model 122 may represent a portal object 102, the portal object 102 may comprise a three-dimensional object such as a rectangular prism. Four surfaces of the rectangular prism may show respective windows that visually take up the entire respective surface. In the example shown in computing environment 100, the window A 108, window B 104, window C 106, and window D 110 may take up the entirety of the respective four surfaces of the portal object 102 they are associated with. Further, each window may be mapped to a MR scene that the user 114 is able to see when they are looking at the window that is mapped to the MR scene. Thus, as the user 114 looks at window A 108, they may be able to see at least a portion of a first MR scene that is mapped to window A 108. As the user 114 looks at window B 104, they may be able to see at least a portion of a second MR scene that is mapped to window B 104, that may be different from MR scene A. Therefore, as the orientation of the rectangular prism changes with respect to the user 114, the user 114 may be able to see different windows of the rectangular prism and therefore may be able to view different MR scenes or portions thereof.

In some embodiments, the MR model 122 may comprise at least a portion of a MR scene. In certain embodiments, the user 114 may be immersed in the MR scene so that they may look around the MR scene. The MR scene may be representative of a room the user 114 is located in, another room associated with the user 114, or be based on another real or theoretical room (e.g., a room created by a design team in a digital environment, a room of another user).

In an example, the virtual viewing position (e.g., virtual viewing position of the portal object 102 and/or of an MR scene) of the user device 112 is determined and matched to a location of the room the user 114 is in. In an example, the room that the user device 112 determines the user to be in (e.g., based on the size of the physical room, the objects in the physical room, user 114 input, sounds in the room, etc.) may cause a rendering system to select a particular set of one or more MR scenes to be shown to the user 114 in an immersive view or using a window of a portal object 102. As an example, if the location is a kitchen, the MR scenes correspond to different kitchen styles.

Although the user device 112 is depicted as being a wearable device, the user device 112 could be other devices other than a wearable device 112. For example, the user device 112 could be a smart phone device, a tablet device, or other user device 112. Further, in some embodiments, more than one user device 112 may be capable of viewing and/or interacting with the same portal object 102.

In some embodiments, as depicted in computing system 100, the user device 112 communicates via the network 116 with a rendering system 118, which renders model data 120 defined by the MR model 122. The model data 120 may also define a compact AR model or another type of MR model 122 associated with the MR model 122. Examples of compact AR models that may be adapted for use with the inventive subject matter are described in U.S. patent application Ser. No. 18/082,952 to Mcgahan titled "Compact Augmented Reality View Experience," filed Dec. 16, 2022, the content of which is incorporated herein by reference in its entirety. A compact AR model may cause model objects to be overlayed over existing physical objects in a physical environment of the user device 112 and leaves a portion of existing physical objects in the field of view visible to the user 114 through the user device 112. In an embodiment, a MR scene objects included in a compact AR model can represent a subset of MR scene objects included in a corresponding VR model.

In some instances, multiple compact AR models are associated with a single virtual model. In other embodiments, the user device 112 comprises the rendering system 118 and the user device 112 can perform all the processing described herein as being performed by the rendering system 118 on the user device 112 without needing to communicate via the network 116.

Figure 2:
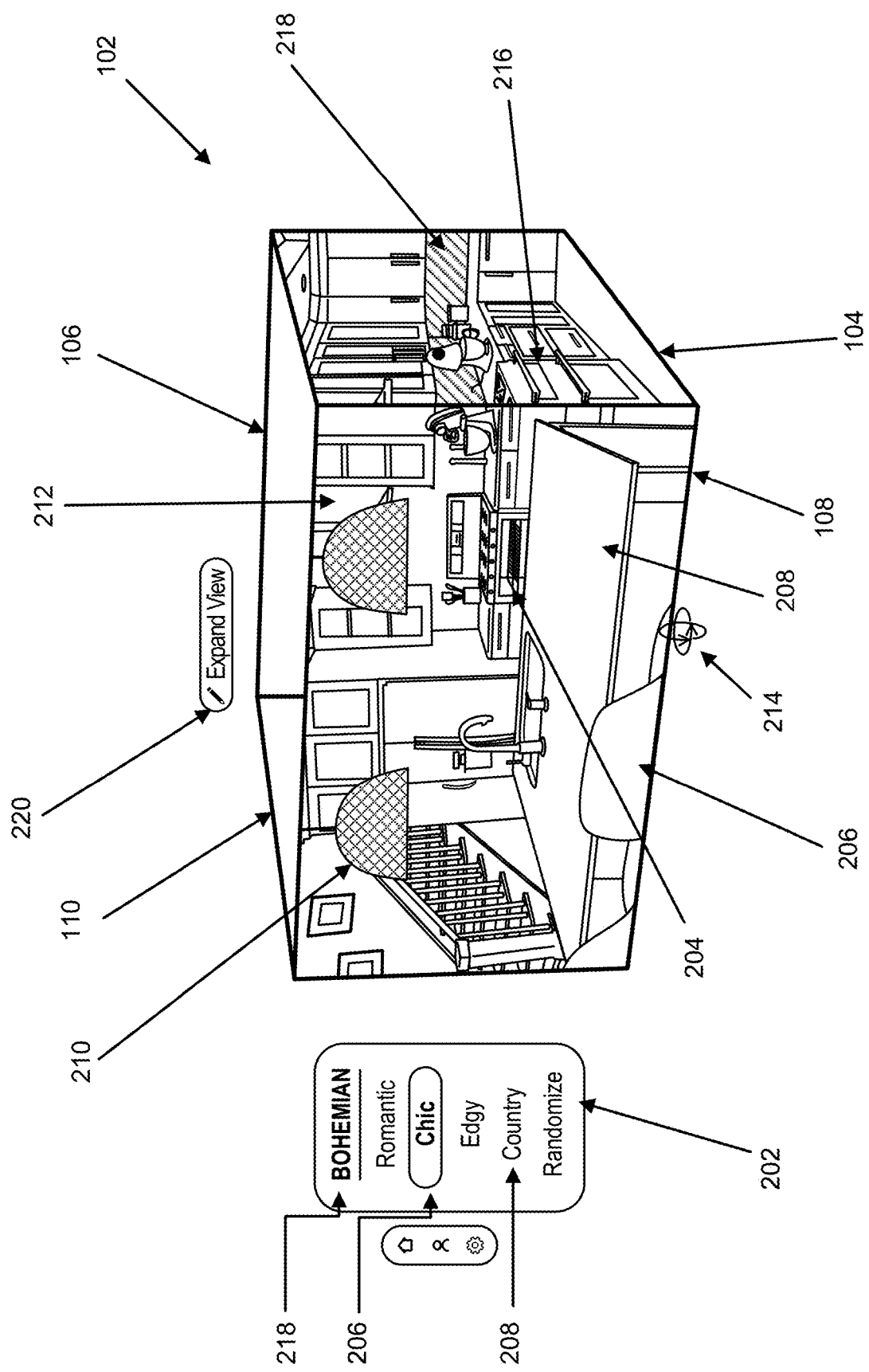
FIG. 2 illustrates an example of a portal object, according to certain embodiments disclosed herein.

FIG. 2 illustrates an example of a portal object, according to certain embodiments disclosed herein.

FIG. 2 illustrates a portal object 102 that is a rectangular prism. As described above, a portal object 102 may be represented in various forms. For example, a portal object 102 may be a two-dimensional object (e.g., square, circle) or a three-dimensional object (e.g., rectangular prism, cube, sphere, cone, a cuboid with two faces removed). Further, the three-dimensional object may be a complex three-dimensional object such as a car, a lamp, a table, a drawer, a book that comprises pages (e.g., where each page is a window or includes at least one window on its surface), etc. Thus, the portal object 102 may include many surfaces of various shapes. In an embodiment, the portal object 102 may be resizable (e.g., the user may specify the size of the portal object 102 by using hand motions) or reoriented (e.g., anchored to a different position, turned).

Further, as described above, a portal object 102 may show an arrangement of windows. FIG. 2 illustrates window A 108, window B 104, window C 106, and window D 110 each appearing as a respective surface of the portal object 102. In an embodiment, each surface of the portal object 102 may show at least one window thereby allowing a MR scene to be mapped to each window of each surface (e.g., a cube with at least six windows so that each window is associated with a surface of the cube). Accordingly, in an embodiment, windows may appear on any number of surfaces of a portal object 102 (e.g., all surfaces or a subset thereof).

Some surfaces of a portal object 102 may show no windows, others may include one, others may include more than one. The windows illustrated in FIG. 2 make up the entirety of the respective surfaces they are associated with. In some embodiments, a window may make up a portion of a surface of the portal object 102. For example, a window may take up less surface area than the associated surface has and the other portions of the surface that the window is not spread across act as a windowless surface of the portal object 102 (the windowless surface may comprise color or be transparent). Thus, in some embodiments, a portal object 102 may comprise surfaces or portions of surfaces that do not include windows (which may be referred to as not having "portal material"). In another example, a window may take up less surface area than the associated surface has and another window takes up at least another portion of the associated surface. As an example, a surface of the rectangular prism portal object 102 may have a first window and a second window that each take up half of the surface area of the portal object surface.

Figure 6:
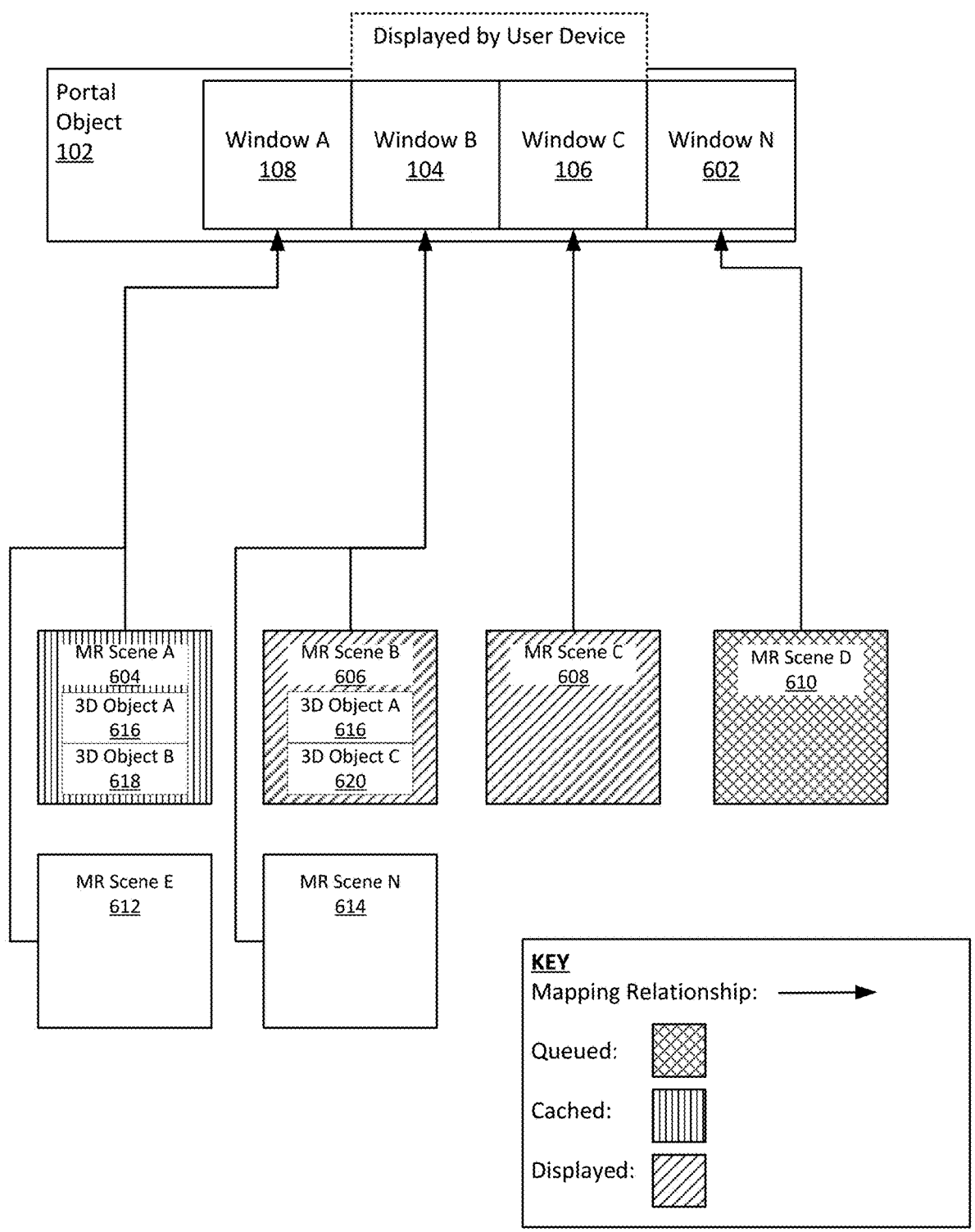
FIG. 6 illustrates an example of how MR scenes may be mapped to windows of a portal object, according to certain embodiments disclosed herein.
Figure 7:
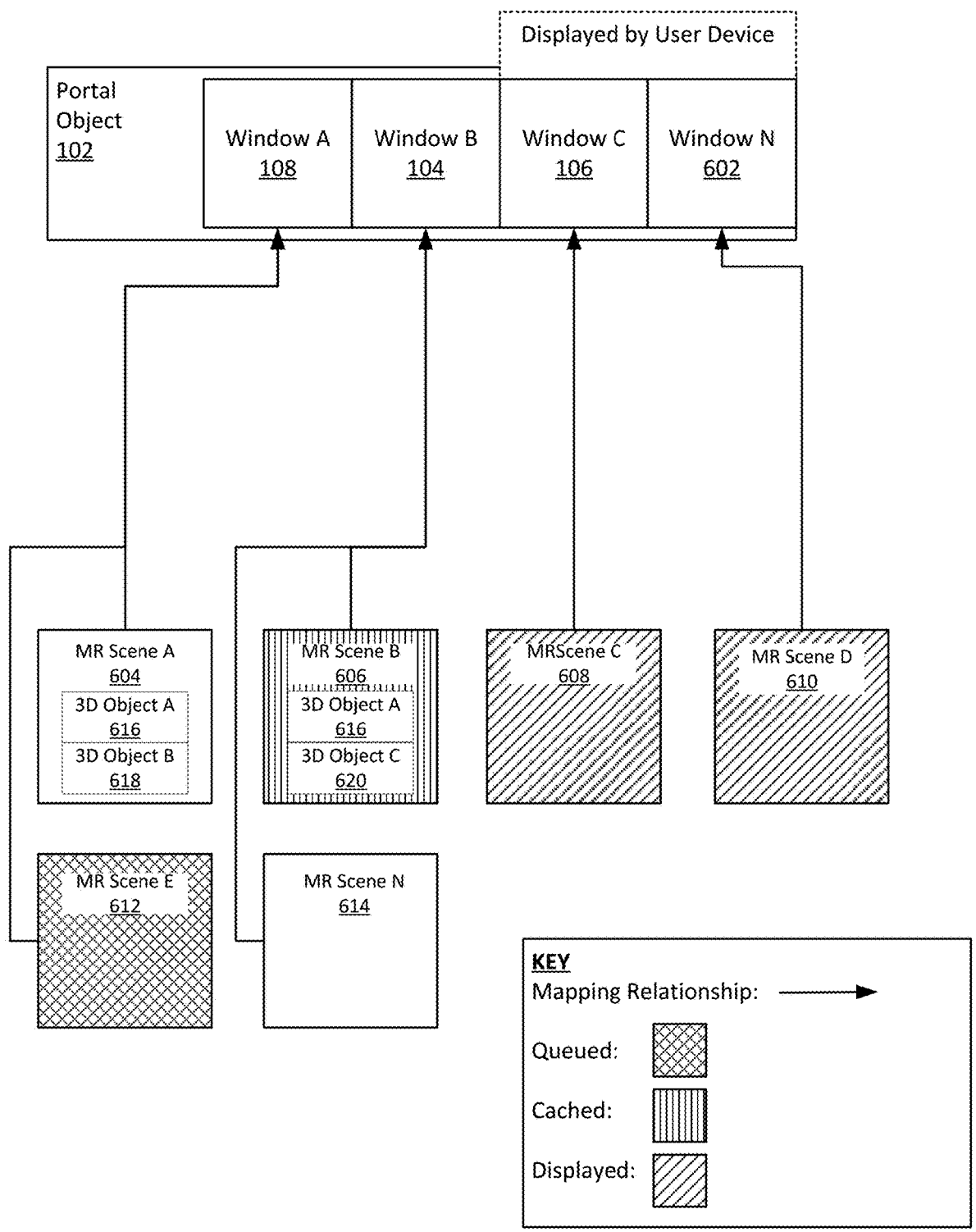
FIG. 7 illustrates an example of how MR scenes may be mapped to windows of a portal object, according to certain embodiments disclosed herein.

Each window may map to at least one MR scene. Referring to FIG. 2 as an example, window A 108 may be mapped to a MR scene A and window B 104 may be mapped to a MR scene B. Thus, when the portal object 102 is oriented so that a user of the user device 112 is able to view window A 108 (e.g., the user device 112 is presenting the surface of the portal object 102 that shows window A 108), at least a portion of the MR scene A mapped to window A 108 can be viewed by the user 114 of the user device 112 (e.g., at least a portion of the MR scene A is presented by the user device 112). FIGS. 6 and 7 describe MR scene mapping in further detail.

Further, it is illustrated that MR scene A and MR scene B may include the same 3D objects as one another. In an embodiment, MR scenes mapped to windows of a portal object 102 include any number of the same 3D objects (the same instantiation of the 3D object or two separate instantiations of a 3D object). In some embodiments, the 3D objects between MR scenes may be the same but the colors, textures, sizes, and/or orientations (e.g., position, perceived angle), etc. may be different between the MR scenes.

For example, the first 3D backsplash object 212 is shown as being different (e.g., style, material, pattern) between MR scene A mapped to window A 108 and the second 3D backsplash object 218 shown in MR scene B mapped to window B 104. As a further example, the 3D object brand or style may also change, such as how the first 3D oven object 204 shown in MR scene A mapped to window A 108 is different than the second 3D oven object 216 in MR scene B mapped to window B 104.

An MR scene may have a viewing anchor point. The viewing anchor point of the MR scene may be in a three-dimensional coordinate space and may have a relationship with the orientation of the portal object 102 in the three-dimensional coordinate space and/or window in the three-dimensional coordinate space mapped to the MR scene. Thus, the viewing anchor point of the MR scene may cause the presentation of the scene to change as the portal object 102 and/or window the scene is associated with is reoriented.

In an embodiment, the viewing anchor point of an MR scene does not move in the three-dimensional coordinate space as the corresponding window it is mapped to changes position in the three-dimensional coordinate space. Therefore, as the window of the scene changes orientation, if the position of the user's virtual viewing position does not change, the scene will appear to remain stationary and the window will control how much of the scene is presented to the user for viewing.

In an embodiment, the viewing anchor point of an MR scene moves in the three-dimensional coordinate space as the corresponding window it is mapped to changes position in the three-dimensional coordinate space (e.g., the viewing anchor point of an MR scene has a relationship with the window position in the three-dimensional space) and/or as the corresponding window it is mapped to changes position with respect to the user (e.g., the user walks around the portal object 102). Therefore, as the window of the scene changes position as the position of the user's virtual viewing position does not change with respect to the three-dimensional coordinate space, the window will appear to the user as moving and the MR scene mapped to the window and presented through the window will appear to also move. Thus, in such an embodiment, different perspectives of the MR scene may be capable of being presented by the user device as the window mapped to the MR scene changes orientation.

As an example, FIG. 2 illustrates that a second angle of the second 3D oven object 216 in the MR scene B mapped to window B 104 is different than the first viewing angle of the first 3D oven object 204 in the MR scene A mapped to window A 108. The perspective at which the second 3D oven object 216 is viewed (and the walkway in front of the second 3D oven object 216) is different than the first 3D oven object 204 in MR scene A mapped to window A 108, even though the two MR scenes have the object within them laid out in a similar fashion.

In other words, the two MR scenes have the 3D oven object at the same position within the MR scene, but the viewing anchor of the two MR scenes are different with respect to one another and the user. Accordingly, FIG. 2 illustrates that when a user is presented with MR scene A of window A 108 when the window A 108 is almost perpendicular with the viewing angle of the user, the user may be able to view MR scene A from an angle that is almost perpendicular to the scene. On the other hand, when the user is presented with MR scene B of window B 104 when the window B 104 is close to parallel with the viewing angle of the user, then the user may only be able to see the MR scene from a viewing angle close to parallel with the anchor point of the MR scene and therefore cause the perspective of the scene to change according to the viewing angle. Further to the point, different portions of the backsplash 3D object are visible in MR scene B mapped to window B 104 compared to MR scene A mapped to window A 108. Additional portions of the second 3D backsplash object 218 that are to the right of the scene from the user's perspective may be visible compared to the first 3D backsplash object 212 shown in MR scene A mapped to window A 108, when window A and window B are in different orientation with respect to the user and/or the three-dimensional space.

Further, other 3D objects shown in MR scene A mapped to window A 108, due to the orientation of the window and the MR scene A anchor point, may not be seen in window A 108 if the user was to rotate window A 108 to the orientation that window B 104 is illustrated as being in. In such a case, the 3D chair object 206, 3D light object 210, and 3D countertop object 208 may not be shown in the MR scene A once the MR scene is oriented into such a position.

In some embodiments, one or more 3D objects (e.g., the 3D chair object 206, the first 3D oven object 204, the second 3D oven object 216) shown in an MR scene may relate to a set of physical objects available in a retail environment.

FIG. 2 further shows that in addition to a portal object 102, a menu may be presented to the user. The menu may allow the user to select which windows of the portal object 102 the user would like to view, the position of the portal object 102, and/or the styles of MR scenes they would like to be able to see in the window(s) of the portal object 102. Any number of menus or other UI elements may be shown to a user to help the user reorient the portal object 102, view windows of the portal object 102, view MR scenes of the portal object 102, alter the portal object 102, alter MR scenes of the portal object 102, and/or alter windows of the portal object 102, etc.

As an example, a UI element may be included to zoom in and/or zoom out, rotate the portal object (e.g., UI element 214), enter an immersive MR scene by expanding the view of the user (e.g., UI element 220), choose a scene to view (menu UI element 202), choose a style of MR scene to view (e.g., style category selection UI element 218, specific style selection UI element 206), change lighting of a MR scene, etc.

FIGS. 3A-D illustrates an example of interactions with a portal object, according to certain embodiments disclosed herein.

A user device 112 may be capable of allowing a user 114 to interact with the portal object 102. The user device 112 may allow for the orientation of the portal object 102 being displayed by the user device 112 to be changed (e.g., changed by the user 114). In an embodiment, the orientation of the portal object 102 being presented by the user device 112 may be changed due to input data generated by the user device 112 and indicative of an interaction of the user 114 with the user device 112. As an example interaction, the user 114 may move at least a portion of their body (e.g., walking, move their eyes, pinch their fingers, swipe their hand), use a verbal command, press a button, turn a dial, etc. to cause the user device 112 to display the portal object 102 in a different orientation. In an embodiment, the orientation of the portal object 102 on the display of the user device 112 may be changed due to time (e.g., the portal object 102 rotates at a set speed), lighting conditions (e.g., the portal object 102 may be displayed more effectively in a different portion of the display that displays less sense sunlight), and/or the physical space the user 114 is located (e.g., virtual object would occlude a physical object within the field of view).

FIGS. 3A-3D show an example where the portal object 102 is rotated around a vertical axis. The portal object 102 may be rotating around the vertical axis due to a user 114 action such as swiping of the user's 114 hand in a certain direction. In an embodiment, as the user 114 interacts with the portal object 102, the portal object 102 rotates and allows the user 114 to view different surfaces of the portal object 102. In an embodiment, the rotation of the portal object 102 is limited to one or more axes (e.g., x-axis, Y-axis, z-axis), windows, and/or surfaces (e.g., so the user 114 may not view a particular surface of the portal object 102, when no MR scene has been mapped to a window associated with the respective surface of the portal object 102, when no window has been associated with the respective surface of the portal object 102, when limitations on the portal object 102 presentation orientation are in place). In an embodiment, the rotation of the portal object 102 is unlimited such that a user may rotate the portal object along any axis individually or in combination (e.g., rotate around the x-axis or y-axis during a single motion, rotate along the x-axis and y-axis simultaneously during a single motion). Thus, the portal object may have up to six degrees of freedom with respect to the three-dimensional coordinate space or may limited to less rotational freedom (e.g., three degrees of freedom).

In the example illustrated in FIGS. 3A-3D, the entirety of the four surfaces of the portal object 102 are mapped to four windows. Thus, in the illustrated embodiment, as the user 114 interacts with the portal object 102, causing the portal object 102 to change orientation, they are presented with different orientations and portions of the portal object 102. As a result, the user device 112 may present the user 114 with one or more surfaces of the portal object 102. If any of the one or more surfaces are associated with windows, the user 114 will be presented with the windows. If the respective windows are mapped to respective MR scenes, then the user 114 will be presented with at least a portion of the respective MR scenes as the user 114 is presented with the windows associated with the surfaces.

Thus, in the example embodiment shown in FIG. 3A, a user 114 may be presented with at least window B 104 based on the orientation of the portal object 102. In an embodiment, the user device 112 presents more than one window of the portal object 102 at the same time. For example, the portal object 102 may be oriented in such a way that window A 108 and window B 104 are simultaneously viewable by the user 114. Thus, the user device 112 may be capable of presenting at least a portion of a first MR scene mapped to window A 108 and at least a second portion of a second MR scene mapped to window B 104 simultaneously.

In an embodiment, orientation of the MR scene changes with respect to the user 114, a different perspective of the MR scene may be presented. The orientation of the MR scene may change due to the portal object 102 and associated window being rotated, enlarged, made smaller, user 114 head movement, user 114 position changing, etc.

As an example for showing a different perspective based on the orientation of the MR scene with respect to the user 114, if the MR scene is directly in front of the user 114 and the full window the MR scene is mapped to is viewed by the user 114 in a first viewing orientation, the user 114 may be capable of seeing what is in the back center of the MR scene, such as an oven or couch. As the window of the portal object 102 changes orientation with respect to the user 114, a different viewing angle of the window surface may be presented to the user 114 where they may not be presented with the back center of the scene anymore, and therefore not able to see the oven or couch, for example. For example, if the window with the MR scene had been rotated eighty degrees from the original straight on first viewing orientation, then only a slim portion of the window and MR scene mapped to the window may be presented by the user device 112 and able to be viewed by the user 114 in the second viewing orientation. Further, the slim portion may be at such an angle from the side that the back center of the MR scene is no longer viewable by the user 114, and instead, the user 114 may presented with a side view of the MR scene and see a chair that was either not presented in the first viewing orientation or was presented but, took up less of the MR scene and appeared on one side of the window, whereas now the chair may appear to be in the center of the slimmer window that is almost out of view of the user 114. Similar changes in user 114 viewing angles may also be caused by reorienting a window (e.g., reorienting a portal object 102) into other orientations (e.g., up, down, left, right, forward, backward, or a combination thereof).

Further, in an embodiment, when a window of a MR scene being viewed at a first orientation with respect to the user 114 is reoriented so that the user 114 is viewing the window and mapped MR scene from a second orientation with respect to the user 114, the viewing angle of any number of 3D objects within the MR scene may also change. For example, when a user 114 views a window and mapped scene from straight on, the user 114 may see a front face of a shelf, but as the window is reoriented to a second orientation, the user 114 may be able to see at least a portion of another side (e.g., top of shelf, bottom of shelf, side of shelf) of the shelf and may still be able to see at least a portion of the original front face of the shelf.

FIG. 3B illustrates a portal object 102 that has been rotated 90 degrees from the position depicted in FIG. 3A. The portal object 102 may have been rotated due to actions of the user 114 with the user device 112 and/or due to other reasons as already described above (e.g., automatic rotation). FIG. 3B shows that the portal object 102 has been rotated by 90 degrees, because the window A 108, window B 104, window C 106, and window D 110 have all changed positions with respect to the position of the user 114. The change in the relative positions of the windows to the user 114 illustrates a change in orientation of the portal object 102.

FIG. 3C shows a 90-degree rotation of the portal object 102 with respect to FIG. 3B. FIG. 3D shows another 90-degree rotation of the portal object 102 with respect to FIG. 3C.

FIGS. 4A-D illustrates an example of interactions with a portal object, according to certain embodiments disclosed herein. In an embodiment, in addition, or alternatively, to the interaction ability detailed with respect to FIG. 3, a user 114 may interact with the portal object 102 to enlarge a window and/or enter a MR scene represented by the window.

FIGS. 4A-D may illustrate the same portal object 102 as the portal object 102 illustrated in FIGS. 3A-D. Thus, the portal object 102 may show window A 108, window B 104, window C 106, and window D 110. The windows may make up (e.g., be spread over, define) four surfaces of the portal object 102. FIG. 3A shows that MR scene 402, of window B 104, may be the primary MR scene shown by the user device 112 that is within a primary window (e.g., window B 104). A MR scene may be a primary MR scene when more of the MR scene is shown than compared to all other MR scenes being shown by the user device 112 and/or when the window the scene is mapped to and shown in is the primary window.

A MR scene may be a primary MR scene when the area of window mapped to the MR scene and being presented by the user device 112 is larger than any other window being presented by the user device 112. For example, the MR scene mapped to the window with the largest surface area being presented to the user 114 may be determined to be the primary MR scene.

A MR scene may be the primary MR scene when an action of the user 114 indicates that the MR scene is the primary MR scene. For example, if eyes of the user 114 are focused on the MR scene and/or the user 114 indicates a selection of the MR scene, the MR scene may be classified as the primary MR scene. Thus, in an embodiment, when a user 114 performs a selection action (e.g., pinching fingers, button press), the user device 112 may determine which MR scene is the primary MR scene by determining which MR scene the eye gaze of the user 114 is gazing at. In another example, an action of the user 114 may indicate that the MR scene is the primary MR scene by the user 114 navigating to the scene, window, or surface of the portal object using more conventional means such as using a mouse, buttons, analog stick, remote, or another selection device.

In an embodiment, when a MR scene is a primary MR scene, the MR scene may become animated, may cause certain corresponding sounds to be output by the user device 112, may cause a user device 112 to vibrate, may cause the user device 112 to emit certain light, etc.

FIG. 4B-C illustrates how what is presented by the user device 112 may be changed according to what the primary MR scene is and/or what actions the user 114 has performed. In an example, the user 114 has selected MR scene 402 and/or window B 104 and therefore, the window is presented as being larger than it was before it was selected. In an example, the user 114 may make a spreading (e.g., zooming) motion with their fingers, and as the user's 114 fingers become more spread apart, window B 104 may become larger and larger. In an embodiment, after a window becomes a certain size, the other windows of the portal object 102 may no longer be shown by the user device 112. For example, once the user 114 has enlarged window B 104 past a certain threshold point, the other surfaces of the portal object 102 may no longer be presented by the user device 112. In an embodiment, as the window becomes larger, additional portions of the MR scene associated with the window are shown by the user device 112 (e.g., the user 114 may be able to see a third MR scene object (e.g., third 3D chair object 404, table object) that was previously out of view once the window is enlarged past a certain point).

FIG. 4D shows that once a window becomes large enough, a first portion of the MR scene may be presented to the user 114 in an immersive MR scene 406. The immersive MR scene 406 may correspond to a virtual viewing position and to the MR scene mapped to window B 104. The immersive MR scene 406 may behave as a MR experience according to the objects in the immersive MR scene 406. A user 114 may be capable of using one or more actions (e.g., moving their body, interacting with a controller) to cause different portions of the immersive MR scene 406 to be shown by the user device 112. For example, a user 114 may cause the viewpoint anchor to change so that different portions of the immersive MR scene 406 can be presented (e.g., by walking around the immersive MR scene 406, enlarging objects).

The immersive MR scene 406 is shown in a field of view. In some cases, the immersive MR scene 406 may be shown in a portion of the field of view and one or more physical objects may be shown in another portion of the field of view. In some instances, the immersive MR scene 406 is overlayed on one or more physical objects so that it occludes the one or more overlayed physical objects.

In an embodiment, when an immersive MR scene 406 is being presented by the user device 112, particular sounds and/or vibrations may be output by the user device 112 that correspond to the immersive MR scene 406 and/or events occurring within the immersive MR scene 406.

In an embodiment, the user 114 may be capable of causing one or more objects of the immersive MR scene 406 to change. For example, the user 114 may perform an action with respect to a first object within the immersive MR scene 406 to cause the object to be added, removed, appearance changed (shape, color, texture, label), repositioned, etc.

In an embodiment, when the user alters a MR scene, while immersed in the scene or not, (e.g., by adding an object, removing an object, changing an appearance of an MR scene object, changing a MR scene style, repositioning an MR scene object, etc.), a new scene is generated and associated with a new or existing window for the portal object 102. In an embodiment, when a new window is added to a portal object 102, the shape of the portal object 102 changes. In an embodiment, when the user 114 alters a MR scene, the MR scene is altered and the alteration is reflected in the MR scene subsequently (e.g., when the user 114 viewed the MR scene through the mapped window of the portal object 102, when the user 114 is presented with an immersive view of the MR scene). A user 114 of the user device 112 may be capable of controlling whether a new MR scene is created or whether an existing MR scene is altered when an alteration to an MR scene is performed.

The user 114 may be able to perform another action (e., selecting a UI element, pressing a button, performing a body movement), which may cause the presentation of immersive MR scene 406 to be dismissed. In an embodiment, when the immersive MR scene 406 is dismissed, a reverse order of the visuals shown to enter the immersive MR scene 406 are shown (e.g., the reverse visual order of FIGS. 4A-4D). In an embodiment, when the MR scene 406 is dismissed, the portal object 102 is presented by the user device 112. In an embodiment, the portal object 102 is oriented in the same orientation that the portal object 102 was before the immersive MR scene 406 was entered.

In an embodiment, a surface of the portal object 102 may be mapped to a MR scene but no portion of the MR scene may be presented by the user device 112 even though the full window is presented. Thus, it is possible that in some embodiments, no portion of a MR scene is viewed through the corresponding window that is mapped to the MR scene. As an example, the portal object 102 surface may not reveal the MR scene until the portal object 102 is interacted with (e.g., the user 114 interacts with the user device 112 to simulate putting their head into the surface of the portal object 102 through the surface mapped to the hidden MR scene, the user 114 performs a specific action, etc.).

In an embodiment, a portal object 102 visually surrounds a user 114 and the user 114 may be within an immersive MR scene not associated with any window. For example, a user 114 may have a virtual viewing position that is within a virtual room so that it appears by the presentation of the UI elements on a display generated by the user device 112 that the user 114 is within the room. Further, at least a boundary of the room (e.g., a wall of the room) may be a window of the portal object 102 that is the at least one boundary of the room. In an embodiment, a portal object 102 fully surrounds the virtual viewing position of the user 114. A user 114 may interact with the portal object 102, windows, and or MR scenes, thereof in similar fashions to the ways in which they may interact with a portal object 102 they are not surrounded by. Other ways of interacting with a portal object 102 are described in more detail herein.

In an embodiment, a portal object 102 may be within MR scenes of other portal objects 102. For example, a portal object 102 may comprise a window corresponding to a mapped MR scene and a user 114 is able to enter the MR scene of the portal object 102 after causing the user device 112 to present an immersive MR scene. During the presentation of the immersive MR scene, a second portal object (that is the same or different from the first portal object 102) may be presented within the immersive MR scene. In an embodiment where a portal object is presented within an immersive MR scene, a window of the virtual object may correspond to the view of the room the user 114 is in (e.g., an AR view).

Figure 5:
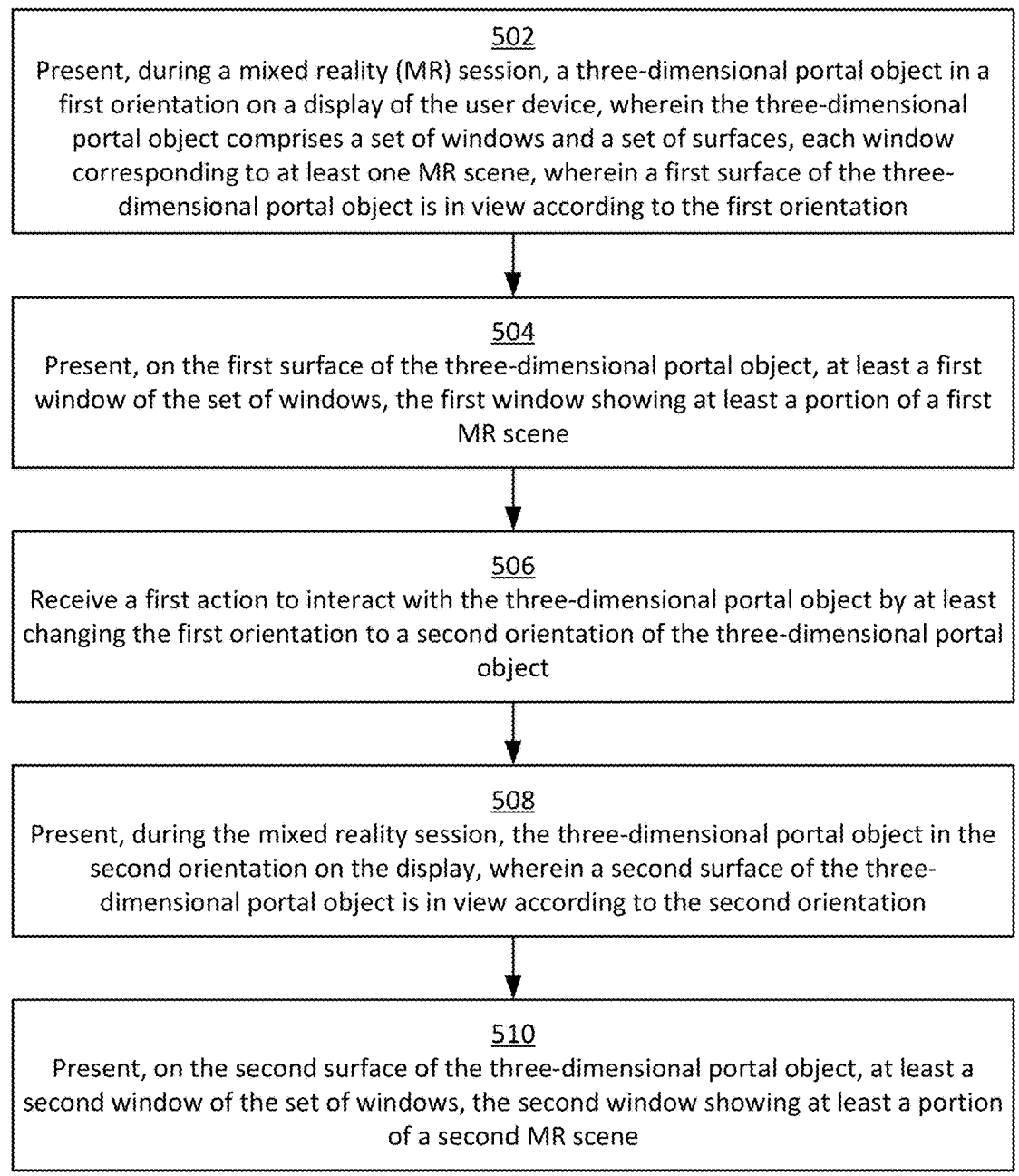
FIG. 5 illustrates a method of interacting with a portal object, according to certain embodiments disclosed herein.

FIG. 5 illustrates a method of interacting with a portal object, according to certain embodiments disclosed herein. As an example, interacting with the portal object may include at least one of: (i) rotating the portal object, and (ii) entering an immersive MR scene represented by a window of the portal object.

At 502, during a mixed reality MR session, a portal object (e.g., three-dimensional portal object) is shown in a first orientation by a user device (e.g., on a display of the user device). The portal object may comprise a set of windows and a set of surfaces (e.g., a window may form a surface of the portal object or be associated with a surface of the portal object). Each window of the set of windows may correspond (e.g., be mapped to) to at least one MR scene. Further, a first surface of the portal object may be in view according to the first orientation of the portal object. In some embodiments, more than one surface may be in view according to the first orientation.

At 504, at least a first window of the set of windows is presented on the first surface of portal object. The first window may show at least a portion of a first MR scene. In an embodiment, the portion of the first MR scene presented on the first surface of the portal object is determined by the orientation of the portal object with respect to a 3D coordinate space and/or a viewing position of a user (e.g., position of user in physical space, position of user's head). For example, the perspective of the MR scene that is presented may be altered based on the orientation of the portal object with respect to the user (e.g., viewing perspective of the MR scene). In an embodiment, the amount of the MR scene and/or viewing angle of the MR scene that is presented on the first surface of the portal object is determined by at least one of: (i) the surface area of the first surface, (iii) the surface area of the first window, and (iii) the perceived position of the portal object with respect to the viewing position of the user and/or a three-dimensional coordinate space.

At 506, a first action to interact with the portal object is received. The first action may cause the portal object to at least change from a first orientation to a second orientation. An action may include at least one of the following: pressing a button, turning a dial, using a voice command, moving of the user's body. An interaction with the portal object may include at least one of the following: rotating the portal object, resizing the portal object, repositioning the portal object, reorganizing windows and/or MR scenes of the portal object, changing the shape of the portal object, etc.

Responsive to receiving the first action, 508 and/or 510 may be performed.

At 508, during the MR session, the portal object may be presented in the second orientation on by the user device (e.g., on a display of the user device). The second orientation may cause a second surface of the portal object to be presented by the user device (e.g., on a display of the user device). Thus, the second orientation may cause the second surface of the portal object to be viewable by the user of the user device according to the second orientation. For example, the second orientation may represent the portal object having been rotated.

At 510, at least a second window of the set of windows may be presented on the second surface of the portal object. The second window may show at least a portion of a second MR scene. For example, a second MR scene may be mapped to the second window and therefore, when the window is presented by the user device, at least a portion of the second MR scene may be presented by the user device. In an embodiment, as a result of the interaction with the portal object, more than one window is presented by the user device that were not presented prior to the interaction. In an embodiment, as a result of the interaction with the portal object, the first window is caused to not be presented by the user device.

The method may further comprise receiving a second action while the portal object is presented in the second orientation. In an embodiment, responsive to the second action, a first portion of an immersive MR scene may be presented by the user device (e.g., on a display of the user device), the immersive MR scene may correspond to a virtual viewing position and to the second MR scene instead of the first MR scene based on the second window being a primary window. According to an embodiment, a primary window is a window that is in view, a window that represents more surface area of the portal object than any other presented surface of the portal object, a window that has been selected (e.g., by a user action), and/or a window that appears closest to the user, etc.

The method may further comprise receiving an indication that the virtual viewing position of the user device has changed and responsive to the indication, presenting a second portion of the immersive MR scene (e.g., on the display of the user device). In an embodiment, the virtual viewing position of the user device changes when the user physically walks or performs another physical action, presses a button, moves a controller, performs a voice command, etc.

The method may further comprise receiving a third action and responsive to the third action, causing the presentation of the immersive MR scene to be dismissed and for the portal object to be presented by the user device (e.g., on the display of the user device). In an embodiment, when the presentation of the immersive MR scene is dismissed, the portal object is presented in the same or different orientation that it was presented before the second action.

FIG. 6 illustrates an example of how MR scenes may be mapped to windows of a portal object, according to certain embodiments disclosed herein.

As discussed above, a portal object 102 may comprise one or more surfaces. Each surface may comprise one or more windows. Further, each window may correspond to one or more MR scenes by being mapped to the one or more MR scenes. The capability for any number of MR scenes to be mapped to any number of windows is represented by MR scene A 604 through MR scene N 614 being illustrated.

Additionally, a user of a user device may be able to view any number of window, MR scenes, and/or surfaces of the portal object 102. The number of surfaces, windows, and/or MR scenes, or portions thereof a user may be able to view (e.g., on a display of a user device) may dependent on rendering parameters or constraints, how large the portal object 102 appears, how large the surfaces of the portal object 102 appear, the shape of the portal object 102, how many surfaces are able to be viewed from the virtual viewing position of the user, how close the virtual viewing position of the user is to the portal object 102, etc.

The portal object 102 illustrated in FIG. 6 may have any number of windows. Thus, the portal object 102 is represented as having window A 108, window B 104, window C 106, through window N 602.

As illustrated in FIG. 6, the window B 104 and the window C 106 may be presented by the user device. For example, both windows may be shown on the user device because they are each spread across different portions of a surface of the portal object 102 that window B 104 and window C 106 correspond to. In an example, both windows may be shown on the user device because the surface area of the surface the windows are associated with is presented by the user device based on the virtual viewing position of the user and/or the orientation of the portal object 102. As a further example, if two surfaces of a three-dimensional rectangular prism portal object 102 have a window spread completely across them like the portal object 102 illustrated in FIG. 1 (e.g., the windows act as surfaces of the portal object 102, the windows are associated with portal material on surfaces of the portal object 102), and the two windows are presented to the user, each window (e.g., window B 104 and window C 106) may be shown on the user device.

FIG. 6 further shows how in some embodiments, MR scenes may be mapped to windows. In an embodiment, more than one MR scene can be mapped to a single window (e.g., MR scene A 604 and MR scene E 612 are mapped to window A 108). The arrows between the MR scenes and the windows represent the mapping illustrated mapping relationship between the exemplary MR scenes and exemplary windows. In an embodiment, any number of MR scenes may be mapped to a single window. In an embodiment, a MR scene may be mapped to multiple windows. In an embodiment, a first portion of a MR scene may be mapped to a first window and a second portion of a MR scene that is different from the first portion may be mapped to a second window. In an embodiment, the portion of a MR scene that is shown in a window is dependent on at least on of: the virtual viewing position of the user, the portion of the window that is presented, the portion of the portal object 102 that is presented, the orientation of the portal object 102, a time value, a random value, and a configurable (e.g., by the user) value.

Each MR scene may comprise any number of 3D objects. In an embodiment, MR scenes may comprise the one or more of the same 3D objects (e.g., MR scene A 604 and MR scene B each include 3D object A 616). In an embodiment, processing power can be reduced by reusing at least a portion (e.g., at least one object and/or data relating to the virtual object (e.g., color, pattern, shading, size, etc.)) of a first MR scene when generating a second MR scene for display. In an embodiment, a first MR scene may comprise one or more different 3D objects than a second MR scene. In some embodiments, at least one 3D object may relate to a set of physical objects available in a retail environment.

In an embodiment where an object that is in a first MR scene is being is reused when generating a second MR scene, the style (e.g., color, lighting, size, features, pattern, etc.) may be different for the object in the first MR scene compared to the style in the second MR scene.

In some embodiments, depending on which windows are shown, and therefore which mapped MR scenes are shown, other MR scenes or portions of MR scenes may be queued and/or cached.

FIG. 6 shows that when window B 104 and window C 106 are shown on the user device, window N 602 may be queued and window A 108 may be cached. In an embodiment, windows are queued and/or cached based on what has previously been presented by the user device, what is currently being presented by the user device, and/or what might be presented next or soon (e.g., within two user actions) on the user device.

In some embodiments, a MR scene (or MR scene portion) may be queued when the MR scene (or portion) is not in a cache and is not being displayed. At least a portion of a MR scene may be queued based on a determination that the MR scene portion may be shown soon (e.g., within a set time, within a set number of user actions, etc.), for example. In an embodiment, when at least a portion of a MR scene may be presented upon a next user action being taken, at least the portion of the MR scene may be queued. By queueing at least a portion of the MR scene, latency of displaying at least the portion of the MR scene may be reduced (e.g., the MR scene is loaded in the background). In some embodiments, more than one MR scene may be queued. The number of MR scenes or the portions of MR scenes that are queued may depend on, how much memory the MR scenes require, how much memory portions of the MR scenes require, which MR scenes have already been cached, and/or a determined prediction likelihood that the user will reorient the portal object 102 so that at least a portion of the MR scene is shown in the corresponding mapped window.

In some embodiments, when a portion of a MR scene is queued, it is loaded into a cache of the user device so that the MR scene data may be obtained more quickly than would otherwise occur.

As an example, if a portal object 102 is oriented so that a user of the user device is presented with window B 104 and window C 106 so that they see at least a portion of MR scene B 606 and MR scene C 608, and if the user was to perform an action with the user device that could cause the user device to present window N 602 on the display, then the user device may proactively queue at least a portion of MR scene D 610 for presentation so that the latency to display MR scene D 610 is reduced upon a user taking the action that results in the presentation of at least a portion of MR scene D 610.

In an embodiment, when at least a portion of MR scene D 610 is queued for presentation, MR scene D 610 may be pre-loaded and hidden. At least a portion of MR scene D 610 may remain hidden until at least the portion of the MR scene D 610 is displayed.

In an embodiment, even when a user is viewing a window and therefore is viewing at least a portion of the corresponding mapped MR scene, the user device may perform queuing and/or caching of an additional portion of the corresponding mapped MR scene. Such queuing and/or caching of at least a portion of the MR scene that is at least partially being viewed may be useful for transitioning to a view where the user is able to view additional portions of the corresponding mapped MR scene.

In some embodiments, at least a portion of a MR scene may be cached or hidden when the portion of the MR scene is not being shown and has already been shown. In an embodiment, the number of MR scenes or the portions of MR scenes that are cached or hidden may depend on which MR scenes, or portions thereof, have most recently been presented by the user device, how much memory the MR scenes require, how much memory portions of the MR scenes require, and/or a determined prediction likelihood that the user will reorient the portal object 102 so that at least a portion of the MR scene is shown in the corresponding mapped window again. Thus, in an embodiment, any number of MR scenes, or portions thereof, may be cached, hidden, and/or queued.

A person of ordinary skill in the art with the benefit of the present disclosure would recognize other reasons for which at least a portion of a MR scene may be cached or queued when not being presented by the user device.

Further, it is shown in FIG. 6 that MR scene E 612 and MR scene N 614 are mapped to window A 108 and window B 104, respectively, but are not shown, queued, or cached, according to the exemplary embodiment.

FIG. 7 illustrates an example of how MR scenes may be mapped to windows of a portal object, according to certain embodiments disclosed herein.

FIG. 7 helps illustrate how the mapping may stay the same between MR scenes and windows of the portal object 102. Further, FIG. 7 illustrates how the MR scenes, or portions of the MR scenes, that are shown, mapped, and queued may be changed (e.g., with respect to FIG. 6) based on which MR scenes, or portions thereof, are being presented by the user device (e.g., on a display of the user device).

As illustrated in FIG. 7, window C 106 and window N 602 may be shown on the user device. Window C 106 and window N 602 may be shown on the user device due to the orientation of the portal object 102, the virtual viewing position of the user, and/or rendering parameters or constraints, etc.

Since window C 106 and window N 602 are shown on the user device, at least a portion of MR scene C 608 and at least a portion of MR scene D 610 may be shown on the user device. Thus, the previously presented MR scenes, or portions thereof, may be cached, hidden, and/or deallocated accordingly. For example, in an embodiment, MR scene B 606 (or a portion thereof) is cached because it was the single most recent MR scene that was presented (or at least partially presented) and no longer being presented by the user device. Thus, if the user was to navigate back (e.g., by reorienting the portal object 102) to where they can see at least a portion of MR scene B 606, MR scene B 606, or a portion thereof, could be quickly loaded into the window B 104 for viewing by the user. As a similar example, in an embodiment, MR scene B 606 (or a portion thereof) is hidden but remains loaded because it was the single most recent MR scene that was presented (or at least partially presented) and is no longer being presented by the user device.

In an embodiment, when a new MR scene is cached (e.g., MR scene B 606), one or more MR scenes that had been cached prior remains cached (additionally, or alternatively, one or more MR scenes may remain loaded and hidden). Thus, in an embodiment similar to the one illustrated in FIG. 7, MR scene A 604 may remain cached even after MR scene B 606 is cached. The number of MR scenes or the portions of MR scenes that remain cached may depend on which MR scenes, or portions thereof, have most recently been presented by the user device, how much memory the MR scenes require, how much memory portions of the MR scenes require, and/or a determined prediction likelihood that the user will reorient the portal object 102 so that at least a portion of the MR scene is shown in the corresponding mapped window again.

Similarly, in an embodiment, MR scene A 604 may remain hidden or cached even after MR scene B 606 is hidden. The number of MR scenes or the portions of MR scenes that remain hidden may depend on which MR scenes, or portions thereof, have most recently been presented by the user device, how much memory the MR scenes require, how much memory portions of the MR scenes require, and/or a determined prediction likelihood that the user will reorient the portal object 102 so that at least a portion of the MR scene is shown in the corresponding mapped window again.

Additionally, FIG. 7 illustrates, that since at least a portion of MR scene D 610 is being presented by the user device, at least a portion of MR scene E 612 is queued for presentation by the user device. Since MR scene E 612 is associated with window A 108, if the user changes from viewing (e.g., moves their body, makes a movement gesture) window C 106 and window N 602 to viewing window N 602 and window A 108, the user may be able to view window N 602 and window A 108 and therefore see at least a portion of MR scene D 610 and at least a portion of MR scene E 612, respectively.

Thus, in an embodiment, the portal object 102 may act like an infinitely scrollable list. Therefore, the MR scenes may be mapped to windows of the portal object 102 in a way that gives the portal object 102 the capability to show each consecutive MR scene in a list of MR scenes as if it is the next item in an infinitely scrollable wrap around list of MR scenes. For example, a user may navigate through viewing window A 108, window B 104, window C 106, window N 602, window A 108, window B 104, window C 106, window N 602, in that order and respectively view at least a portion of MR scene A 604, MR scene B 606, MR scene C 608, MR scene D 610, MR scene E 612, MR scene N 614, MR scene A 604, and MR scene B 606.

In an embodiment, a MR scene and a window have a one-to-one mapping. In an embodiment (like the one shown in FIGS. 6 and 7), more than one MR scene may be mapped to a window, but the windows do not behave like a wrap-around list of MR scenes. For example, window A 108 may be mapped to MR scene A 604 and MR scene E 612 while window C 106 is only mapped to MR scene C 608.

In an embodiment, a user device may be capable of receiving input that toggles between or allows for the selection of a particular MR scene from a set of MR scenes that are mapped to a window. For example, a user may be able to view window A 108 on the user device and toggle between seeing at least a portion of MR scene A 604 in window A 108 and at least a portion of MR scene E 612 in window A 108.

Figure 8:
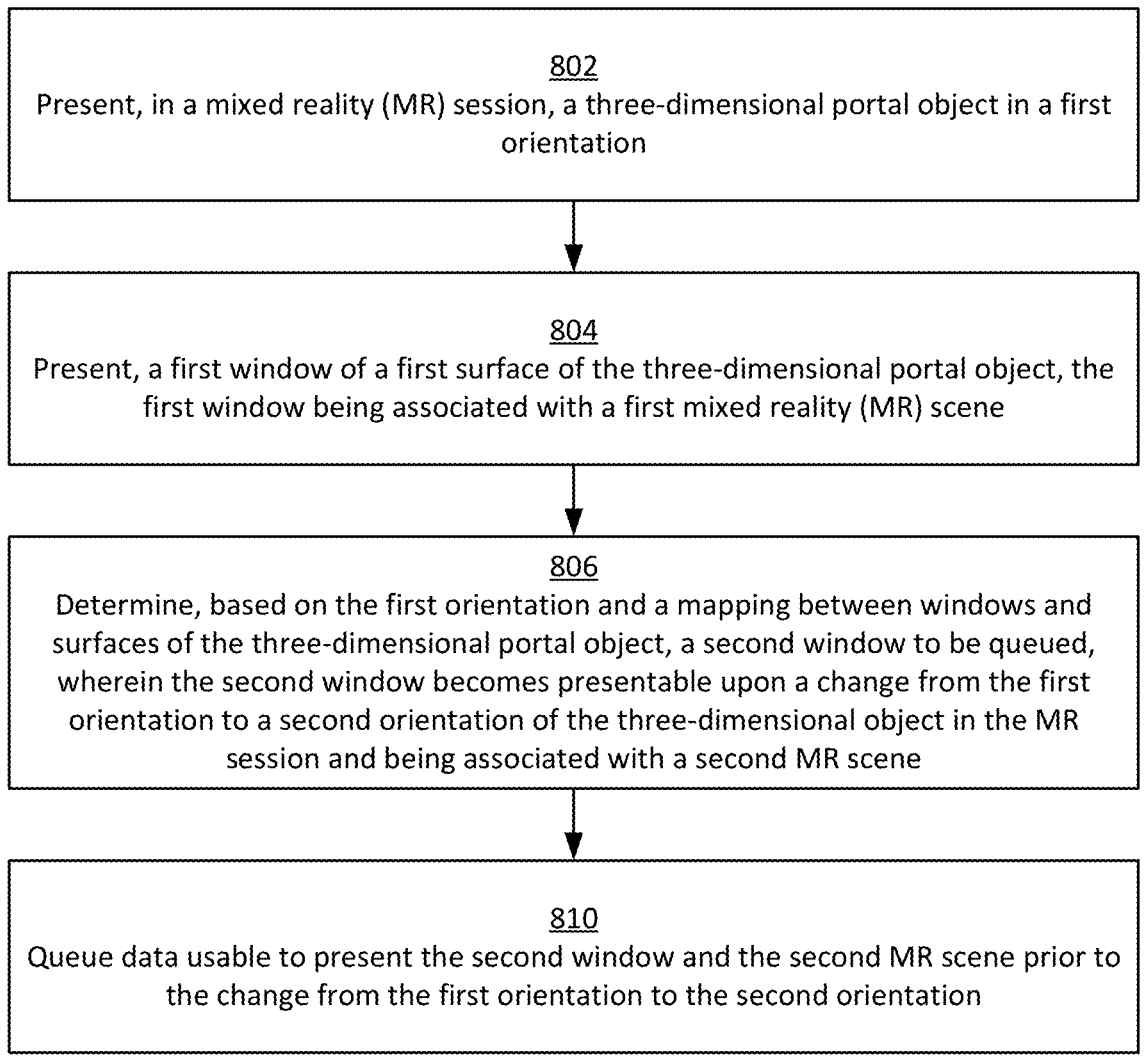
FIG. 8 illustrates a method of mapping MR scenes to windows of a portal object, according to certain embodiments disclosed herein.

FIG. 8 illustrates a method of mapping MR scenes to windows of a portal object, according to certain embodiments disclosed herein.

At 802, in a MR session, a portal object (e.g., three-dimensional portal object) may be presented in a first orientation. In an embodiment, the portal object may be presented in a way that enables the capability to present one or more surfaces of the portal object. Further, at least a portion of the presented surfaces may be presented by the user device.

At 804, a first window of a first surface of the portal object may be presented. The first window may be associated with a first MR scene. In an embodiment, at least a portion of the first window is presented. In an embodiment, the first window is associated with more than one MR scene, but the first MR scene is caused to be presented (e.g., based on an order of presentation, based on a selection, based on a default presentation, based on the physical environment, etc.)

At 806, based on the first orientation and an association between windows and surfaces of the portal object, a second window to be queued may be determined. The second window may become presentable upon a change from the first orientation to a second orientation of the portal object in the MR session and the second window may be associated with a second MR scene. Thus, in an embodiment, at least a portion of the second MR scene is queued based on a determination that the corresponding second window that the second MR scene is mapped to may become presentable. In an embodiment, more than on MR scene may be queued.

In an embodiment, a window could be determined to possibly become presentable based on which orientations could be caused by an action (e.g., orientation change, list selection, voice command, QR code scan, item recognition, etc.).

At 810, data usable to present the second window and the second MR scene may be queued prior to the change from the first orientation to the second orientation. In an embodiment, the queue may be implemented using a cache. In an embodiment, the when the second MR scene is queued, the second MR scene may be pre-loaded and hidden prior to the change from the first orientation to the second orientation and then become unhidden after the change from the first orientation to the second orientation. In an embodiment, the second MR scene may be pre-loaded and hidden until a condition occurs (e.g., a user input, a time value is reached, another MR scene is hidden and/or cached), whether the portal object is in the second orientation or not.

Figure 9:
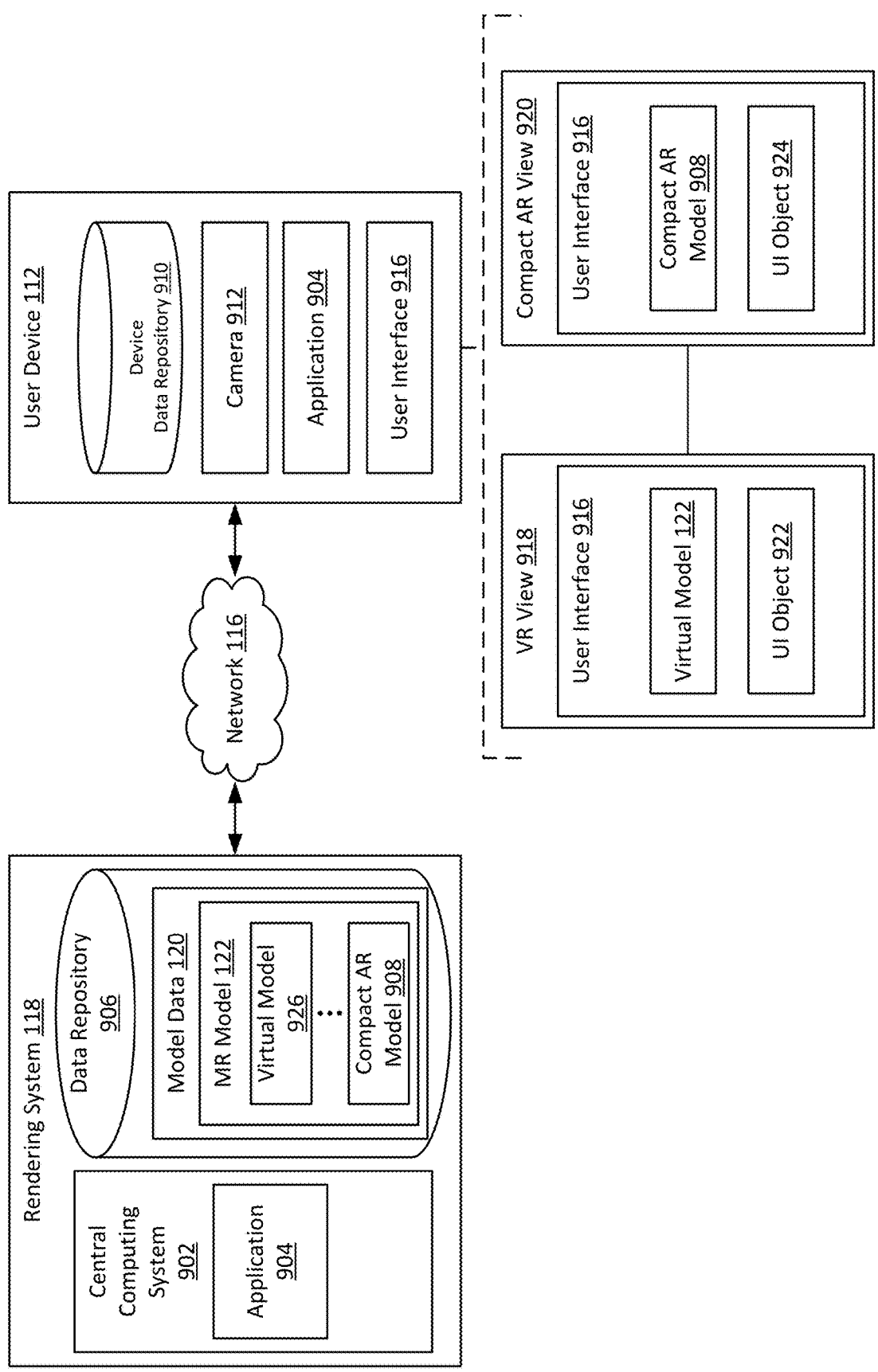
FIG. 9 depicts further details of the computing environment of FIG. 1, according to certain embodiments disclosed herein.

FIG. 9 depicts further details of the computing environment of FIG. 1, according to certain embodiments disclosed herein.

Elements that are found in FIG. 1 are further described in FIG. 9 and referred thereto using the same element numbers. In certain embodiments, the rendering system 118 includes a central computing system 902, which supports an application 904. The application 904 could be a mixed reality application. For example, the mixed reality may include an augmented reality ("AR") and/or a virtual reality ("VR"). The application 904 enables a presentation of a MR model 122 (e.g., a compact AR model 908 and/or a virtual model 926 of the physical environment in a compact AR view 920 and/or VR view 918, respectively). The application 904 may be accessed by and executed on a user device 112 associated with a user of one or more services of the rendering system 118. For example, the user may access the application 904 via a web browser application of the user device 112. In other examples, the application 904 is provided by the rendering system 118 for download on the user device 112. As depicted in FIG. 9, the user device 112 communicates with the central computing system 902 via the network 116. Although a single user device 112 is illustrated in FIG. 9, the application 904 can be provided to (or can be accessed by) multiple user devices 112. Further, although FIG. 9 depicts a rendering system 118 that is separate from the user device 112 and that communicates with the user device 112 via the network 116, in certain embodiments the rendering system 118 is a component of the user device 112 and the functions described herein as being performed by the rendering system 118 are performed on the user device 112.

In certain embodiments, the rendering system 118 comprises a data repository 906. The data repository 906 could include a local or remote data store accessible to the central computer system 902. In some instances, the data repository 906 is configured to store the model data 120 defining the MR model 122 (e.g., the compact AR model 908, a virtual model 926). The model data 120 may comprise portal object data, window data, mapping data, and/or MR scene data. A compact AR model 908 may be associated with the virtual model 926.

As shown in FIG. 9, the user device 112 comprises, in some instances, a device data repository 910, a camera 912, the application 904, and a user interface 916. The device data repository 910 could include a local or remote data store accessible to the user device 112. The camera 912 communicates with the application 904. The camera 912 is capable of capturing a field of view as depicted in FIG. 1. The user interface 916 enables the user of the user device 112 to interact with the application 904 and/or the rendering system 118. The user interface 916 could be provided on a display device (e.g., a display monitor), a touchscreen interface, or other user interface that can present one or more outputs of the application 904 and/or rendering system 118 and receive one or more inputs of the user of the user device 112. The user interface 916 can include a MR view which can present a MR model 122 within the MR view. As an example, a compact AR view 920 can present the compact AR model 908 within the compact AR view 920.

The user interface 916 can also display a user interface (UI) object 924 in a MR view, such as the compact AR view 920. Responsive to detecting a selection of the UI object 924, the rendering system 118 may change the MR model 122 being presented. For example, responsive to detecting a selection of the UI object 924, the rendering system 118 may cease displaying the compact AR view 920 that includes the compact AR model 908 and begin displaying a VR view 918 including the virtual model 926 (which may be associated with the compact AR model 908). In some embodiments, UI object 924 selection causes the rendering system 118 to change a portion of a MR scene, window, and/or portal object that is being presented.

The user interface 916 can also display a user interface (UI) object 922 in a VR view 918, for example. Responsive to detecting a selection of the UI object 922, the rendering system 118 can cease displaying the VR view 918 that includes the virtual model 926 and begin displaying a different MR view (e.g., the compact AR view 920 including the compact AR model 908 (which may be associated with the virtual model 926)). In some embodiments, UI object 924 selection causes the rendering system 118 to change a portion of a MR scene, window, and/or portal object that is being presented.

Thus, in some embodiments, the rendering system 118 may alternate between displaying, via the user interface 916, the VR view 918 and the compact AR view 920 responsive to detecting selection of the UI object 922 and UI object 924. In some embodiments, when an immersive MR scene is being presented by the user device 112, a compact AR view 920 or a VR view 918 is being displayed via the user interface 916. In some embodiments, a VR view 918 is used to display a portal object via the user interface 916.

Figure 10:
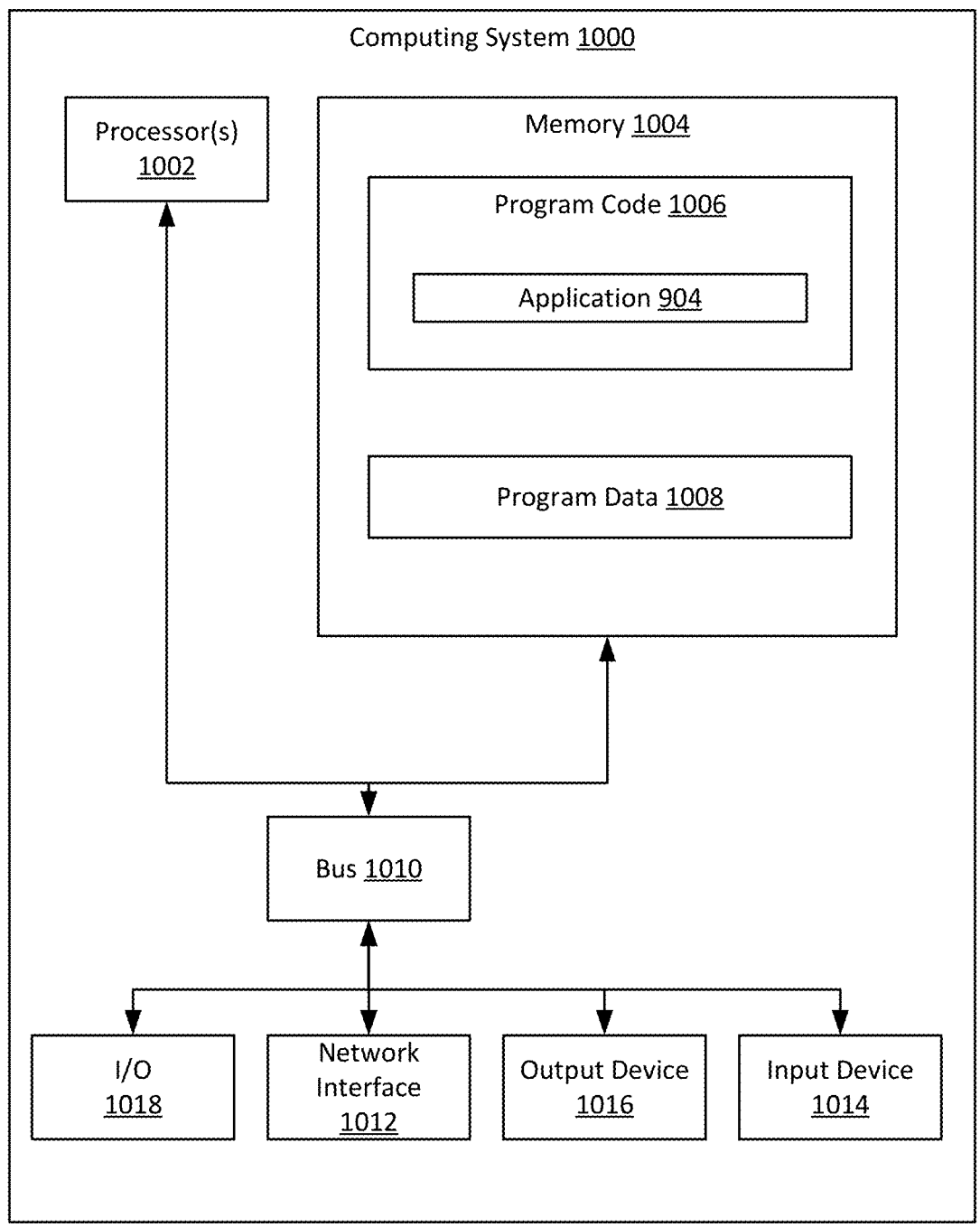
FIG. 10 depicts an example of a computing system that performs certain operations described herein, according to certain embodiments described in the present disclosure.

Any suitable computer system or group of computer systems can be used for performing the operations described herein. For example, FIG. 10 depicts an example of a computing system 1000. The depicted example of the computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing program code 1006, program data 1008, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1004 can be volatile memory, non-volatile memory, or a combination thereof.

The computing system 1000 executes program code 1006 that configures the processor 1002 to perform one or more of the operations described herein. Examples of the program code 1006 include, in various embodiments, the rendering system 118 and subsystems thereof (which may include a location determining subsystem, a mixed reality rendering subsystem, and/or a model data generating subsystem) of FIG. 1, which may include any other suitable systems or subsystems that perform one or more operations described herein (e.g., one or more neural networks, encoders, attention propagation subsystem and segmentation subsystem). The program code 1006 may be resident in the memory device 1004 or any suitable computer-readable medium and may be executed by the processor 1002 or any other suitable processor.

The processor 1002 is an integrated circuit device that can execute the program code 1006. The program code 1006 can be for executing an operating system, an application system or subsystem, or both. When executed by the processor 1002, the instructions cause the processor 1002 to perform operations of the program code 1006. When being executed by the processor 1002, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 1004 store the program data 1008 that includes one or more datasets described herein. In some embodiments, one or more of data sets are stored in the same memory device (e.g., one of the memory devices 1004). In additional or alternative embodiments, one or more of the programs, data sets, models, and functions described herein are stored in different memory devices 1004 accessible via a data network. One or more buses 1010 are also included in the computing system 1000. The buses 1010 communicatively couple one or more components of a respective one of the computing system 1000.

In some embodiments, the computing system 1000 also includes a network interface device 1012. The network interface device 1012 includes any device or group of devices suitable for establishing a wired or wireless data connection to one or more data networks. Non-limiting examples of the network interface device 1012 include an Ethernet network adapter, a modem, and/or the like. The computing system 1000 is capable of communicating with one or more other computing devices via a data network using the network interface device 1012.

The computing system 1000 may also include a number of external or internal devices, an input device 1014, a presentation device 1016, or other input or output devices. For example, the computing system 1000 is shown with one or more input/output ("I/O") interfaces 1018. An I/O interface 1018 can receive input from input devices or provide output to output devices. An input device 1014 can include any device or group of devices suitable for receiving visual, auditory, or other suitable input that controls or affects the operations of the processor 1002. Non-limiting examples of the input device 1014 include a touchscreen, a mouse, a keyboard, a microphone, a separate mobile computing device, etc. A presentation device 1016 can include any device or group of devices suitable for providing visual, auditory, or other suitable sensory output. Non-limiting examples of the presentation device 1016 include a touchscreen, a monitor, a speaker, a separate mobile computing device, etc.

Although FIG. 10 depicts the input device 1014 and the presentation device 1016 as being local to the computing system 1000, other implementations are possible. For instance, in some embodiments, one or more of the input device 1014 and the presentation device can include a remote client-computing device (e.g., user device 112) that communicates with computing system 1000 via the network interface device 1012 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 11:
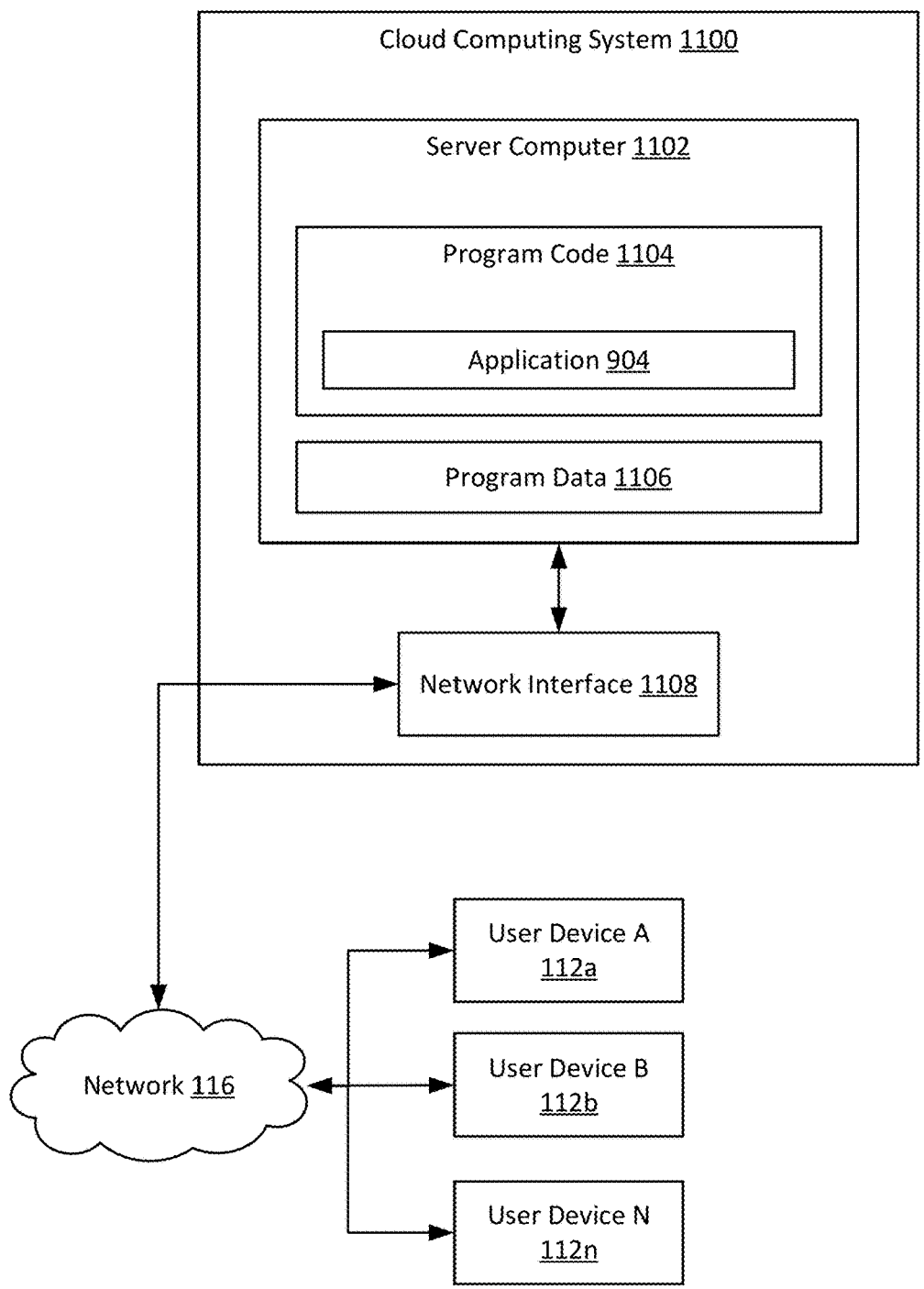
FIG. 11 depicts an example of a cloud computing system that performs certain operations described herein, according to certain embodiments described in the present disclosure.

In some embodiments, the functionality provided by computing system 1000 may be offered as cloud services by a cloud service provider. For example, FIG. 11 depicts an example of a cloud computing system 1100 offering a service for providing MR models 122 (e.g., compact AR models 908 for generating mixed reality views of a physical environment and/or offering a service for providing virtual models 926 for generating mixed reality views of a physical environment). In the example, the service for providing MR models 122 (e.g., compact AR models 908, virtual models 926) for generating mixed reality views of a physical environment may be offered under a Software as a Service (SaaS) model. One or more users may subscribe to the service for to provide MR models 122 for generating mixed reality views of a physical environment and the cloud computing system 1100 performs the processing to provide MR models 122 for generating mixed reality views of a physical environment. The cloud computing system 700 may include one or more remote server computers 708.

The remote server computers 1102 include any suitable non-transitory computer-readable medium for storing program code 1104 (e.g., including the application 904 of FIG. 10) and program data 1106, or both, which is used by the cloud computing system 1100 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1102 can include volatile memory, non-volatile memory, or a combination thereof. One or more of the server computers 1102 execute the program code 1104 that configures one or more processors of the server computers 1102 to perform one or more of the operations that provide MR models 122 (e.g., compact AR models 908 and/or virtual models 926) for generating mixed reality views of a physical environment.

As depicted in the embodiment in FIG. 11, the one or more servers providing the services for providing MR models 122 (e.g., compact AR models 908, virtual models 926) for generating mixed reality views of a physical environment may implement the rendering system 118 central computing system 902, and the application 904. Any other suitable systems or subsystems that perform one or more operations described herein (e.g., one or more development systems for configuring an interactive user interface) can also be implemented by the cloud computing system 1100.

In certain embodiments, the cloud computing system 1100 may implement the services by executing program code and/or using program data 1106, which may be resident in a memory device of the server computers 1102 or any suitable computer-readable medium and may be executed by the processors of the server computers 1102 or any other suitable processor.

In some embodiments, the program data 1106 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 116.

The cloud computing system 1100 also includes a network interface device 1108 that enable communications to and from cloud computing system 1100. In certain embodiments, the network interface device 1108 includes any device or group of devices suitable for establishing a wired or wireless data connection to the data networks 116. Non-limiting examples of the network interface device 1108 include an Ethernet network adapter, a modem, and/or the like. The service for providing MR models 122 for generating mixed reality views of a physical environment is capable of communicating with any number of user devices, as represented by the user devices 112*a*, 112*b*, through 112*n* via the data network 116 using the network interface device 1108.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A user device, the user device comprising:
   one or more processors; and
   one or more memory storing instructions that, upon execution by the one or more processors, configure the user device to:
   present, during a mixed reality (MR) session, a three-dimensional portal object in a first orientation on a display of the user device, wherein the three-dimensional portal object comprises a set of windows and a set of surfaces, each window corresponding to at least one MR scene, wherein a first surface of the three-dimensional portal object is in view according to the first orientation;
   present, on the first surface of the three-dimensional portal object, at least a portion of a first window of the set of windows, the first window showing at least a portion of a first MR scene having a first virtual object having a first style
   receive a first action to interact with the three-dimensional portal object by at least changing the first orientation to a second orientation of the three-dimensional portal object; and responsive to receiving the first action:
present, during the MR session, the three-dimensional portal object in the second orientation on the display, wherein a second surface of the three-dimensional portal object is in view according to the second orientation, and
present, on the second surface of the three-dimensional portal object, at least a portion of a second window of the set of windows, the second window showing at least a portion of a second MR scene having a second virtual object having a second style.

2. The user device of claim 1, wherein when the three-dimensional portal object is in a third orientation, different than the first orientation, the first surface and the second surface of the three-dimensional portal object are in view, and a third window is not in view, wherein the third window corresponds to a third surface of the three-dimensional portal object.

3. The user device of claim 2, wherein in the third orientation, at least a different portion of the first MR scene of the first window and at least a different portion of the second MR scene of the second window are presented, the first window having a different orientation than the second window.

4. The user device of claim 2, wherein in the third orientation, a window orientation of the first window changes, causing the first MR scene to be presented differently than in the first orientation and the second MR scene to be presented differently than the first MR scene.

5. The user device of claim 1, wherein the first MR scene is presented from a different viewing angle than the second MR scene when the three-dimensional portal object is in the first orientation.

6. The user device of claim 1, further comprising:
receive a second action while the three-dimensional portal object is presented in the second orientation; and
responsive to the second action, present a first portion of an immersive MR scene on the display, the immersive MR scene corresponding to a virtual viewing position and to the second MR scene instead of the first MR scene based on the second window being a primary window.

7. The user device of claim 6, wherein the primary window is determined based on at least one of the following: (i) an area of the second window being presented by the user device compared to other windows being presented by the user device or (ii) an action of a user indicates that the second window is the primary window.

8. The user device of claim 6, wherein the second MR scene corresponding to the primary window behaves differently when the second window is the primary window compared to when the second window is not the primary window.

9. The user device of claim 6, further comprising:
receive an indication that the virtual viewing position of the user device has changed; and
responsive to the indication, presenting a second portion of the immersive MR scene on the display of the user device.

10. The user device of claim 6, further comprising:
receive a third action; and
responsive to the third action, causing the presentation of the immersive MR scene to dismiss and presenting the three-dimensional portal object on the display of the user device.

11. The user device of claim 6, wherein a second three-dimensional portal object is presented in the immersive MR scene.

12. The user device of claim 1, wherein after the first action to interact with the three-dimensional portal object is received, at least one of: (i) the first MR scene or (ii) the second MR scene is cached or hidden.

13. The user device of claim 1, wherein further comprising:
receiving a second action; and
responsive to the second action, presenting at least a portion of the first window of the first surface of the three-dimensional portal object, the first window showing (i) at least a portion of the first MR scene or (ii) at least a portion of a third MR scene.

14. The user device of claim 1, wherein a number of windows in the set of windows is less than a number of surfaces of the three-dimensional portal object.

15. The user device of claim 1, wherein the three-dimensional portal object simulates an immersive virtual environment.

16. A user device, the user device comprising:
one or more processors; and
one or more memory storing instructions that, upon execution by the one or more processors, configure the user device to:
present, in a mixed reality (MR) session, a three-dimensional portal object in a first orientation;
present, a first window on a first surface of the three-dimensional portal object, the first window being associated with a first mixed reality (MR) scene having a first virtual object having a first style;
determine, based on the first orientation and a mapping between windows and surfaces of the three-dimensional portal object, a second window to be queued, wherein the second window becomes presentable upon a change from the first orientation to a second orientation of the three-dimensional portal object in the MR session and being associated with a second MR scene having a second virtual object having a second style; and
queue data usable to present the second window and the second MR scene prior to the change from the first orientation to the second orientation.

17. The user device of claim 16, wherein each MR scene is mapped to a window based on at least one of: (i) how many surfaces the three-dimensional portal object includes, (ii) a user configuration, (iii) a physical environment the user device is located in, or (iv) a predetermined mapping.

18. The user device of claim 16, wherein at least one virtual object within the first MR scene and the second MR scene is the same and data for the at least one virtual object is reused from presenting the first MR scene to present the second MR scene.

19. The user device of claim 18, wherein the at least one virtual object has a different style when presented in the first MR scene compared to when presented in the second MR scene and the at least one virtual object relates to a set of physical objects available in a retail environment.

20. The user device of claim 16, wherein the second MR scene is stored in a cache at least when it is: (i) queued for presentation or (ii) has previously been presented; and wherein when the second MR scene is queued for presentation, the second MR scene is queued based on at least one of: (i) which MR scenes are being displayed in windows of the three-dimensional portal object and (ii) MR scenes that are selectable by a user of the user device.

* * * * *